US012245026B2

(12) United States Patent
Martin de la Bastide et al.

(10) Patent No.: US 12,245,026 B2
(45) Date of Patent: Mar. 4, 2025

(54) TECHNIQUES FOR SECURE DATA TRANSMISSION USING A SECONDARY DEVICE

(71) Applicant: APPLE INC., Cupertino, CA (US)

(72) Inventors: Olivier Martin de la Bastide, Paris (FR); Frank Andries van den Berg, Valencia (ES); Jean-Christophe A. Raynon, San Jose, CA (US)

(73) Assignee: Apple Inc., Cupertino, CA (US)

( * ) Notice: Subject to any disclaimer, the term of this patent is extended or adjusted under 35 U.S.C. 154(b) by 369 days.

(21) Appl. No.: 17/484,940

(22) Filed: Sep. 24, 2021

(65) Prior Publication Data
US 2023/0102615 A1    Mar. 30, 2023

(51) Int. Cl.
*H04W 12/033* (2021.01)
*H04L 9/40* (2022.01)
(Continued)

(52) U.S. Cl.
CPC ....... *H04W 12/033* (2021.01); *H04L 63/0492* (2013.01); *H04W 4/80* (2018.02);
(Continued)

(58) Field of Classification Search
CPC ..... H04W 12/033; H04W 4/80; H04W 76/10; H04W 12/50; H04W 12/08; H04L 63/0492
See application file for complete search history.

(56) References Cited

U.S. PATENT DOCUMENTS

| 10,853,788 | B1 * | 12/2020 | Zafar | G06Q 20/40 |
| 2007/0297610 | A1 * | 12/2007 | Chen | H04L 9/083 380/270 |

(Continued)

FOREIGN PATENT DOCUMENTS

| EP | 2 993 633 A1 | 3/2016 |
| EP | 3 115 951 A1 | 1/2017 |

OTHER PUBLICATIONS

"International Search Report and Written Opinion," mailed Jan. 11, 2023 in International Application No. PCT/US2022/044627. 11 pages.

(Continued)

*Primary Examiner* — Darshan I Dhruv
(74) *Attorney, Agent, or Firm* — Kilpatrick Townsend & Stockton LLP

(57) ABSTRACT

A computing device may receive, from an electronic device and via a wireless connection, a request to securely transmit user information using a secure data exchange module of the computing device. The computing device may configure the secure data exchange module for conducting a secure transmission of the user information and transmit a notification to the electronic device. The computing device may provide a user interface on the computing device for conducting the secure transmission of the user information. The computing device may receive and/or send, via the secure data exchange module, the user information. The computing device may transmit, via the wireless connection, the user information to the electronic device. The computing device may receive, from the electronic device, confirmation of a successful processing of the user information. The computing device may provide an indication of the confirmation of the successful processing of the user information.

18 Claims, 11 Drawing Sheets

(51) Int. Cl.
  *H04L 29/06* (2006.01)
  *H04W 4/80* (2018.01)
  *H04W 12/08* (2021.01)
  *H04W 12/50* (2021.01)
  *H04W 76/10* (2018.01)

(52) U.S. Cl.
  CPC ........... *H04W 12/08* (2013.01); *H04W 12/50* (2021.01); *H04W 76/10* (2018.02)

(56) References Cited

U.S. PATENT DOCUMENTS

| | | | |
|---|---|---|---|
| 2012/0123945 A1* | 5/2012 | Charrat | G06Q 20/3278 705/26.1 |
| 2014/0279479 A1* | 9/2014 | Maniar | G06Q 20/382 705/41 |
| 2015/0100499 A1* | 4/2015 | Dua | G06Q 20/32 705/76 |
| 2015/0278799 A1* | 10/2015 | Palanisamy | G06Q 20/385 705/76 |
| 2016/0063490 A1* | 3/2016 | Ziat | G06Q 20/401 |
| 2016/0239823 A1* | 8/2016 | Bengtsson | H04L 63/08 |
| 2017/0013457 A1* | 1/2017 | Polak | H04L 63/08 |
| 2018/0007040 A1* | 1/2018 | Thom | G06F 21/575 |
| 2018/0077124 A1 | 3/2018 | Ramoutar | |
| 2018/0082288 A1* | 3/2018 | Chester | G06Q 20/3821 |
| 2018/0249332 A1* | 8/2018 | Schell | H04W 8/205 |
| 2019/0087166 A1* | 3/2019 | Plache | G06F 21/44 |
| 2019/0303909 A1 | 10/2019 | De la Torre | |
| 2019/0332787 A1 | 10/2019 | Graf et al. | |
| 2020/0380496 A1* | 12/2020 | Moon | G06Q 20/326 |
| 2021/0012339 A1* | 1/2021 | Rafferty | G06Q 20/3223 |
| 2021/0074417 A1* | 3/2021 | Pierson | H04L 67/52 |
| 2021/0287201 A1* | 9/2021 | Hernandez | G06Q 20/325 |
| 2022/0408238 A1* | 12/2022 | Qi | H04W 76/14 |
| 2024/0163676 A1 | 5/2024 | Han et al. | |

OTHER PUBLICATIONS

Opperman, Charl A. et al., "A Generic NFC-enabled Measurement System for Remote Monitoring and Control of Client-side Equipment." 2011 Third International Workshop on Near Field Communication. 6 pages.

"Notice of Allowance," mailed Nov. 7, 2023 in U.S. Appl. No. 17/485,007. 23 pages.

"Non-Final Office Action," mailed Nov. 22, 2023 in U.S. Appl. No. 17/484,978. 18 pages.

U.S. Appl. No. 17/484,978 , "Final Office Action", May 24, 2024, 19 pages.

U.S. Appl. No. 17/485,007 , "Final Office Action", Jul. 16, 2024, 24 pages.

European Patent Application No. EP24189739.6 , "Extended European Search Report", Aug. 23, 2024, 8 pages.

European Patent Application No. EP24189756.0 , "Extended European Search Report", Aug. 23, 2024, 9 pages.

* cited by examiner

TECHNIQUES FOR SECURE DATA TRANSMISSION USING A SECONDARY DEVICE

BACKGROUND

Electronic devices can have various different capabilities including the capability to exchange information using various different protocols (e.g., near field communications protocol). For security reasons, certain types of data exchanges are reserved for certain protocols since the limited transmission distance provides a measure of security. However, not all electronic devices incorporate all the various wireless protocols. Additionally, various devices with the desired protocol may not have appropriately desired capabilities (e.g., larger screen size, advanced memory, and/or advanced processing capabilities).

BRIEF SUMMARY

Certain embodiments of the present disclosure can provide methods, systems, and apparatuses for secure data transmission using a secondary device.

In some aspects, a method performed by a computing device includes: receiving, from an electronic device and via a wireless connection, a request to securely transmit user information using a secure data exchange module of the computing device; configuring the secure data exchange module for conducting a secure transmission of the user information; transmitting a notification to the electronic device, the notification indicating that the secure data exchange module is ready to collect the user information; providing a user interface on the computing device for conducting the secure transmission of the user information; receiving, via the secure data exchange module, the user information; transmitting, via the wireless connection, the user information to the electronic device; receiving, from the electronic device and via the wireless connection, confirmation of a successful processing of the user information; and providing, via the user interface, an indication of the confirmation of the successful processing of the user information.

In some aspects, the method includes receiving a user input authorizing the computing device to conduct the secure transmission of the user information.

In some aspects, the electronic device and the computing device are paired.

In some aspects, the electronic device and the computing device utilize a same user account.

In some aspects, the secure data exchange module uses near field communication protocol.

In some aspects, the electronic device is configured to transmit the user information to a service provider.

The method according to claim 1, wherein the electronic device is configured to receive a configuration from a service provider.

In some aspects, configuring the secure data exchange module comprises: verifying an applet is loaded; verifying a configuration is updated; and verifying an attestation is conducted.

In some aspects, a non-transitory computer-readable medium storing a set of instructions includes one or more instructions that, when executed by one or more processors of a computing device, cause the computing device to: receive, from an electronic device and via a wireless connection, a request to securely transmit user information using a secure data exchange module of the computing device; configure the secure data exchange module for conducting a secure transmission of the user information; transmit a notification to the electronic device, the notification indicating that the secure data exchange module is ready to collect the user information; provide a user interface on the computing device for conducting the secure transmission of the user information; receive, via the secure data exchange module, the user information; transmit, via the wireless connection, the user information to the electronic device; receive, from the electronic device and via the wireless connection, confirmation of a successful processing of the user information; and provide, via the user interface, an indication of the confirmation of the successful processing of the user information.

In some aspects, the one or more instructions further cause the computing device to receive a user input authorizing the computing device to conduct the secure transmission of the user information.

In some aspects, the electronic device and the computing device are paired.

In some aspects, the electronic device and the computing device utilize a same user account.

In some aspects, the secure data exchange module uses a near field communication protocol.

In some aspects, the electronic device is configured to transmit the user information to a service provider.

The method according to claim 1, wherein the electronic device is configured to receive a configuration from a service provider.

In some aspects, the one or more instructions, that cause the computing device to configure the secure data exchange module, cause the computing device to: verify an applet is loaded; verify a configuration is updated; and verify an attestation is conducted.

In some aspects, a computing device includes: one or more memories; and one or more processors, communicatively coupled to the one or more memories, configured to: receive, from an electronic device and via a wireless connection, a request to securely transmit user information using a secure data exchange module of the computing device; configure the secure data exchange module for conducting a secure transmission of the user information; transmit a notification to the electronic device, the notification indicating that the secure data exchange module is ready to collect the user information; provide a user interface on the computing device for conducting the secure transmission of the user information; receive, via the secure data exchange module, the user information; transmit, via the wireless connection, the user information to the electronic device; receive, from the electronic device and via the wireless connection, confirmation of a successful processing of the user information; and provide, via the user interface, an indication of the confirmation of the successful processing of the user information.

In some aspects, the one or more processors are further configured to receive a user input authorizing the computing device to conduct the secure transmission of the user information.

In some aspects, the electronic device and the computing device are paired.

In some aspects, the secure data exchange module uses a near field communication protocol.

Other embodiments of the described techniques are directed to systems, apparatus, and computer readable media associated with methods described herein. In one embodiment, the computer readable medium contains instructions for receiving data and analyzing data, but not instructions for directing a machine to create the data (e.g., sequencing nucleic acid molecules). In another embodiment, the computer readable medium does contain instructions for directing a machine to create the data. In one embodiment, a computer program product comprises a computer readable medium storing a plurality of instructions for controlling a processor to perform an operation for methods described herein. Embodiments are also directed to computer systems configured to perform the steps of any of the methods described herein, potentially with different components performing a respective step or a respective group of steps.

Reference to the remaining portions of the specification, including the drawings and claims, will realize other features and advantages of embodiments of the described techniques. Further features and advantages, as well as the structure and operation of various embodiments of the described techniques, are described in detail below with respect to the accompanying drawings. In the drawings, like reference numbers can indicate identical or functionally similar elements.

These and other embodiments of the disclosure are described in detail below. For example, other embodiments are directed to systems, devices, and computer readable media associated with methods described herein.

A better understanding of the nature and advantages of embodiments of the present disclosure may be gained with reference to the following detailed description and the accompanying drawings.

BRIEF DESCRIPTION OF THE DRAWINGS

Like reference symbols in the various drawings indicate like elements, in accordance with certain example implementations. In addition, multiple instances of an element may be indicated by following a first number for the element with a letter or a hyphen and a second number.

DETAILED DESCRIPTION

Figure 1:
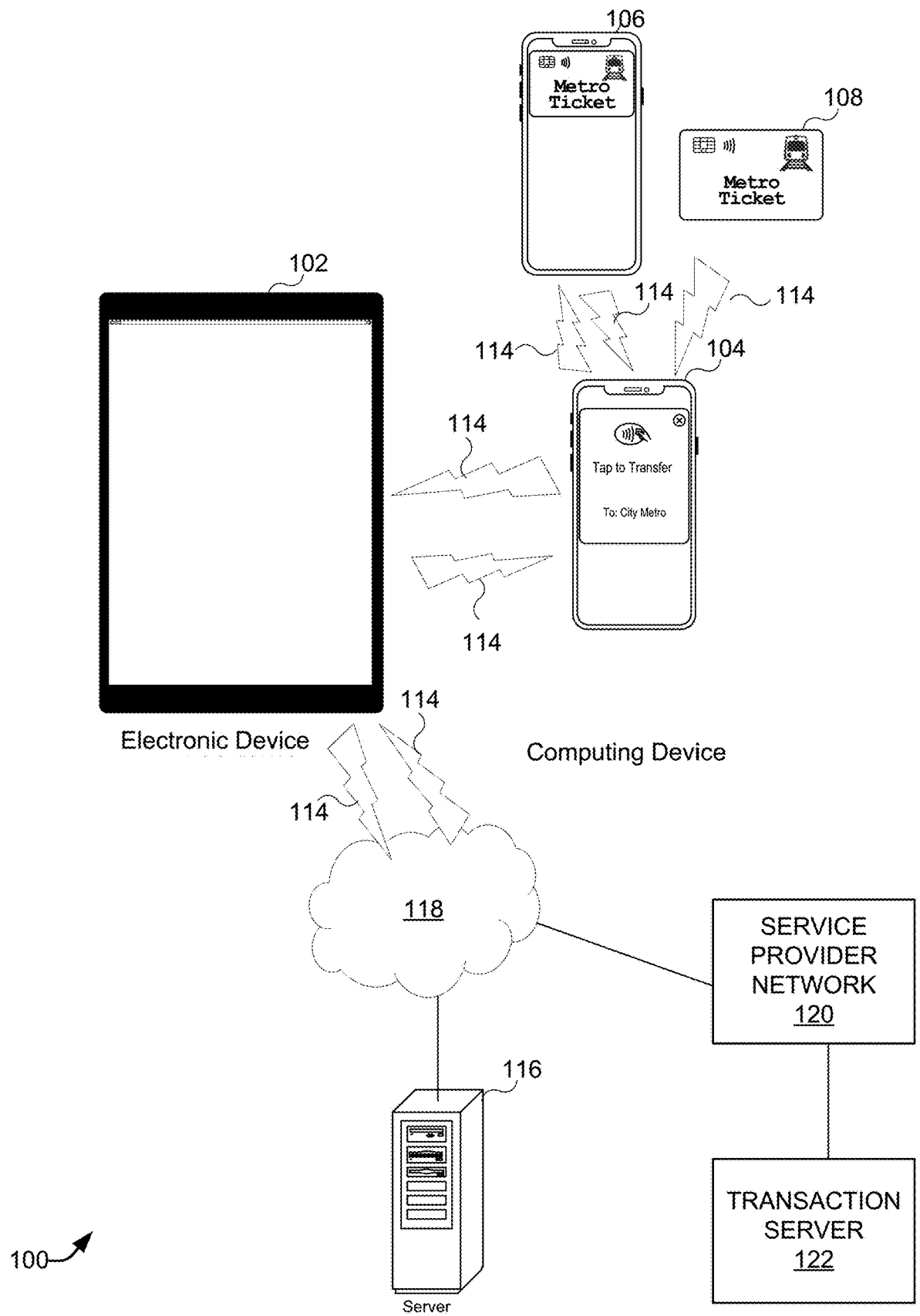
FIG. 1 is a block diagram illustrating electronic devices wirelessly communicating during information transmission in accordance with an embodiment of the present disclosure.

Certain embodiments of the present disclosure can provide methods, systems, and apparatuses for enabling a first device to use capabilities associated with a second device but not enabled on the first device. These capabilities can include secure data transmission using a secondary device. The secondary device can be a mobile device and in some examples is only configured to be used by the same user as the first device. In some cases, the first device will be referred to as an electronic device. The electronic device can include a tablet computer, a laptop computer, desktop computer, a mobile terminal, a wearable device, a smartphone, or the like. For this disclosure, the electronic device may not include certain wireless protocol capabilities (e.g., Near-Field Communication (NFC) or the like. The secondary device will be referred to as a computing device. The computing device can include a tablet computer, a laptop computer, desktop computer, a mobile terminal, a wearable device, a smartphone, or the like. For the purpose of this disclosure, the computing device can include any of the above-noted devices, but does include certain wireless protocol capabilities (e.g., NFC or the like)

The larger screen size of the electronic device can improve the display of text and images for conducting transactions. In various situations, an electronic device can be used for the secure transfer of user information. In certain circumstances, a user of an electronic device may desire to transmit or receive user information over a certain wireless protocol (e.g., NFC or the like). Due to the larger screen size or improved processing capabilities, a user may prefer to use the electronic device for the transfer of user information over another computing device having the desired wireless protocol capabilities. The certain wireless protocol can be desired because of various characteristics of the wireless protocol. For example, NFC communications may be limited to a few centimeters (e.g., less than 20 centimeters). This limited range can be useful for security aspects because the devices may need to be in close proximity to each other to transfer user information.

In certain circumstances, an electronic device may not have a capability to send or receive user information over the desired wireless communication protocol (e.g., NFC protocol). In those circumstances, techniques can be used for the electronic device to interact with the electronic device having the desired wireless communication protocol capabilities. In various embodiments, the computing device can be a smartphone (e.g., an iPhone), a tablet computer, a laptop computer, a wearable device (e.g., an electronic device), a desktop computer, or a service based device. The computing device can be any device that can receive user information via the desired wireless protocol and send the user information to the electronic device. The computing device can receive data via a secure communication protocol (e.g., NFC, Bluetooth, Zigbee, etc.). In various embodiments, the user information can be transmitted by another computing device 106 with compatible secure communication protocol capabilities or a ticket 108 (e.g., a metro ticket or other entry pass) with compatible communication protocol capabilities. In some examples, data can be sent to the user device (e.g., instead of user info being received). For example, after buying a train ticket, the ticket (e.g., information that identifies the ticket) could be loaded to the computing device 106 via a tap. Additionally, while the techniques described herein regularly refer to secure data transmissions, it will be understood that non-secure transactions are also envisioned, or the computing device could be performing an action that doesn't involve a wireless transmission, as long as the electronic device triggers an action on the nearby computing device to complete an experience (e.g., enter a PIN, take a picture, capture motion from sensors, etc.).

FIG. 1 illustrates an example communication between the electronic device 102 and a computing device 104. The electronic device 102 can communicate with a server device 116 via a network 118 (e.g., the Internet or other public or private network connection). The electronic device 102 can include one or more applications to manage the receipt of user information. The user information can include key information (e.g., electronic hotel room keys or vehicle keys), ticket information for events (e.g., electronic movie tickets, concert tickets, play tickets, etc.), transportation information (e.g., airline, train, bus, taxi, ferry information), identification information (e.g., electronic driver's licenses or non-driver identifications, insurance cards), or even user account information. The one or more applications can present a user interface on a display of the electronic device 102. The one or more applications can include various applications (e.g., a ticket management application to receive electronic tickets from various users at a venue (e.g., a concert)) to receive, manage, validate, authenticate, verify, accept, process, transfer, or confirm the user information. In other embodiments, the one or more applications can include a room security software that allows for managing access to a location (e.g., hotel, room, fitness area, pool, parking, office, restrooms, or venue). The one or more applications can include a payment terminal system (e.g., a point of sale application) to manage the receipt of user information that includes secure payment information.

The electronic device 102 can include a ranging module. The ranging module can detect one or more computing devices in the vicinity of the electronic device. The ranging module can include an ultra-wide band (UWB) communication capability. In various embodiments, the electronic device 102 can display a list of available computing devices for a user to select. In various embodiments, the ranging module can calculate a distance (e.g., a range) to each of the other computing devices. The user interface can display the distances to each of the detected computing devices. In various embodiments, an electronic device 102 can allow a user to select one of one or more computing devices 104 in a vicinity of the electronic device. In various embodiments, the electronic device can allow a user to select one of the computing devices within the vicinity of the electronic device. In various embodiments, the electronic device 102 can be electronically paired with the computing device 104 and the paired computing device can be selected. In various embodiments, the electronic device 102 can select the computing device automatically. In various embodiments, the automatic selection of the computing device can be based at least in part on range. The electronic device can communicate with the one of the one or more communicating devices via a wireless protocol (e.g., Bluetooth, Bluetooth Low Energy (BLE), Wi-Fi).

The electronic device 102 can receive the user information from the computing device 104 via a wireless protocol (e.g., Bluetooth, BLE, Wi-Fi). The electronic device 102 can transmit the user information to a server device 116 of a service provider. For example, the user information can be an electronic driver's license and the service provider can be a state government server that can be used to verify that the driver's license information is valid and authentic. In the payment context, the service provider can be a financial institution (e.g., a credit card company) that can verify the payment credentials. The server device can authenticate the payment information that is sent as the user information.

In particular, the electronic device 102 and the computing device 104 may wirelessly communicate during a financial transaction. In various embodiments, the electronic device 102 can be used by a vendor to make sales (e.g., point of sale device). For example, the financial transaction may initiate when a user of electronic device 102 can execute a point of sale application that can calculate and provide a transaction amount associated with the financial transaction to the computing device 104. For example, the user may enter the transaction amount via a user interface (such as a physical keyboard, a virtual keyboard displayed on a multi-touch screen, etc.). As described further below with reference to FIG. 2, a processor in electronic device 102 may forward the transaction amount to a secure element in the computing device 104 via a wireless protocol.

After receiving the transaction amount, an activated payment applet (which is henceforth referred to as a merchant payment applet) executing in an environment of the secure element may generate, using an encryption key associated with the secure element (such as an encryption key associated with a provider of the secure element, a security domain in the secure element and/or the merchant payment applet), a signed blob based on the transaction amount, a merchant identifier (such as an identifier of the computing device 104), an identifier of the electronic device 102, a user identifier (e.g., any type of identifier that uniquely identifies a user, including generic and/or proprietary IDs from certain companies) and, optionally, a transaction identifier (which may be predetermined or dynamically generated by the secure element and/or the merchant payment applet). For example, the signed blob may be encrypted using the encryption key and may be signed using a digital signature that is specific to the computing device 104 and/or components in the computing device 104 (such as the secure element). A "blob" may include a block or a group of data or information.

Then, a user of a second computing device 106 (such as another cellular telephone) may activate a payment applet (which is henceforth referred to as a "counterparty payment applet") in a secure element in the second computing device 106. For example, the user of the second computing device 106 may activate the counterparty payment applet via an application (e.g., a digital wallet, a passbook and/or a mobile payments application) executed in an environment (such as an operating system) of a processor in the second computing device 106. However, in some embodiments the counterparty payment applet is activated by the second computing device 106 when the computing device 104 is proximate to the second computing device 106. In various embodiments, the computer device 104 may not include a point of sale (POS) application that is incorporated in the electronic device 102.

When a user of the second computing device 106 (such as another smartphone) positions the second computing device 106 proximate to the computing device 104, the merchant payment applet (or a radio controller and/or second computing device 106) may communicate connection information (such as encryption/decryption keys, passwords, identifiers, etc.) to the computing device 104 via radio using a wireless protocol (e.g., near-field communication.) In order to ensure compatibility with legacy electronic devices, the near-field-communication radios may operate in a reader mode. In response, the counterparty payment applet may communicate additional connection information to the computing device 104 via a radio using near-field communication. While "connection information" and "additional connection information" are described here, note that "connection information" sometimes encompasses both the connection information and the additional connection information. In order to ensure compatibility with electronic devices only supporting near-field communication in card emulation mode, the near-field-communication controllers in the radios may operate in a reader mode. However, both devices may operate in peer-to-peer mode. Note that proximity may involve physical contact between computing devices 104, 106 (such as touching or tapping the computing device 104 on the second computing device 106) or may be contactless (e.g., the computing device 104 may be within the radiation pattern of an antenna in the second computing device 106, such as within a few inches to a foot). As noted previously, this wireless communication may use a radio-frequency-identification communication protocol (such as near-field communication). Thus, the wireless communication may or may not involve a connection being established between the computing devices 104, 106, and therefore may or may not involve communication via a wireless network (such as a cellular-telephone network).

Moreover, computing devices 104, 106 may, via radios, establish a connection between computing devices 104, 106 based on the connection information and the additional connection information. For example, computing devices 104, 106 may be paired based on Bluetooth connection information to establish a Bluetooth or a Bluetooth Low Energy connection or link. Thus, touching or bringing the computing device 104, shown in FIG. 1, proximate to the second computing device 106, as shown in FIG. 1, may allow a direct connection via peer-to-peer wireless connection (with rich-data communication) to be established. While near-field communication may allow an encryption/decryption key to be exchanged between computing devices 104, 106 as shown in FIG. 1, subsequent wireless communication between computing devices 104, 106 in FIG. 1 may be encrypted/decrypted. Concurrently, the merchant payment applet may communicate the signed blob to the second computing device 106 via a radio using near-field communication. Thus, the connection may be established in parallel with the communication of the signed blob. This approach may allow the user of the second computing device 106 to conduct the financial transaction by bringing the second computing device 106 into proximity with the computing device 104 once—a so-called "one-tap transaction." The operations of establishing the connection and communicating the signed blob may be performed concurrently so that the overall transaction time is short. However, if the pairing occurs faster than often occurs in present technology (such as 1-10 seconds), then the connection may be established first, and then the signed blob may be communicated between computing devices 104, 106 via radios using the connection. Similarly, if a Wi-Fi network exists in the environment of computing devices 104, 106, the connection information may include a service set identification and password, which may allow the radio to establish a Wi-Fi connection with the radio, so that subsequent communication (including communicating the signed blob) may occur via Wi-Fi. Alternatively, if a connection already exists between computing devices 104, 106, then the operations involving near-field communication may be excluded from the financial-transaction technique, and the communication between computing devices 104, 106 may occur via radios using the connection. In some embodiments, computing devices 104, 106 communicate via a cellular-telephone network and the operations involving near-field communication may be excluded from the financial-transaction technique.

After receiving the signed blob, the counterparty payment applet may create a signed transaction blob. The signed transaction blob may include the transaction amount, the merchant identifier, financial-account information and, optionally, the transaction identifier. For example, the financial-account information may be associated with the counterparty payment applet and may specify a financial account, such as a credit-card account (and, more generally, a financial vehicle associated with a financial account, such as a credit card or a debit card) that the user of the second computing device 106 is using to provide payment for items or services being purchased during the financial transaction. In particular, the financial-account information may (in some instances) include a device-specific tokenized card number instead of the financial institution primary account number (PAN) or credit-card number. The device-specific tokenized card number may be thought of as a "virtual" credit card number that corresponds/maps to a "real" PAN. The financial-account information may correspond to or be equivalent to magnetic-stripe data on a credit card.

In some embodiments the financial-account information includes so-called "track 1" data and/or "track 2" data, such as: a token associated with a financial-account identifier, a cardholder-name field, an expiration date of the financial account specified by the financial-account identifier, a numerical value corresponding to a number of financial transactions conducted by second computing device 106, a dynamic card verification value (DCVV) for the financial transaction, and/or additional data.

Thus, the financial-account information may (in some instances) exclude explicit identifiers of the user of the second computing device 106 to protect their privacy, and may dynamically or indirectly specify the financial account to prevent subsequent fraud or misuse of the financial-account information (such as if a malicious party intercepts the financial-account information during the wireless communication). In addition to using the device-specific tokenized card number, the cardholder-name field may include information specifying a provider or manufacturer of the second computing device 106 (e.g., Apple Inc., of Cupertino, Calif, which manufactures the iPhone and other similar devices) and a placeholder for the user or the credit cardholder's name, such as "VALUED CUSTOMER." However, outside of the United States, the cardholder's name may not be included with the financial-account information. Moreover, the financial-account information may include a truncated counter value (such as the least-significant three bits, four bits or five bits of a two-byte counter value) combined with the dynamic card verification value. The dynamic card verification value may be dynamically generated by the secure element in the second computing device 106 for each financial transaction using a cryptographic technique using the device-specific tokenized card number, the counter value, one or more cryptographic keys and a random number provided by the computing device 104 during the wireless communication. Consequently, a different dynamic card verification value may be generated for each financial transaction.

Note that creating the signed transaction blob may or may not involve decrypting the signed blob; thus, the second computing device 106 may or may not have access to a decryption key corresponding to the encryption key. Consequently, the signed transaction blob may include the signed blob or may include information associated with the signed blob that is extracted by the merchant payment applet and/or the secure element on the second computing device 106. Furthermore, creating the signed transaction blob may involve encryption of at least a portion of the transaction blog using an encryption key associated with the second computing device 106 (e.g., an encryption key associated with a provider of the secure element, a security domain in the secure element and/or the counterparty payment applet), and may be signed using a digital signature that is specific to the second computing device 106 and/or components in the second computing device 106 (e.g., the secure element). Note that, in general, the encryption key associated with the second computing device 106 may (or may not) be different than the encryption key associated with the computing device 104.

Next, the counterparty payment applet may communicate the signed transaction blob to the computing device 104 via a radio using the connection. Furthermore, the merchant payment applet may communicate the signed transaction blob to the electronic device 102. The electronic device can communicate the signed transaction blob to a server 116 to conduct the financial transaction.

In various embodiments where the communication occurs via a Wi-Fi connection or a cellular-telephone network, the second computing device 106 may communicate the signed transaction blob to server 116. Note that the communication with server 116 may occur via a radio and, more generally, via an interface circuit or a network interface circuit. Thus, the communication with the server may involve wireless communication, wired communication and/or optical communication, and may use the same and/or different communication protocols than those used between computing devices 104, 106. In general, the communication with server 116 may occur via a network 118, such as: the Internet, a wireless local area network, an Ethernet network, an intranet, an optical network, etc.

Server 116 may be associated with a third party that is other than users of computing devices 104, 106. For example, the third party may include a provider of the computing device 104 and/or the second computing device 106. Alternatively, the third party may include a service provider network 120. For example, for financial transactions the service provider may be a financial institution or a party authorized by the financial institution to authorize payments.

After receiving the signed transaction blob, server 116 can provide the information included in the signed transaction blob to a service provider network 120. In various embodiments, the service provider network can be a payment network. Alternatively, the computing device 104 may provide the signed transaction blob to the service provider network 120. In response, service provider network 120 and/or transaction server 122 (e.g., a financial institution such as a bank, which may be an issuer of the credit card or financial vehicle being used to pay for the financial transaction) may process or complete the financial transaction using the information included in the signed transaction blob. For example, after successful verification of the financial account and the user of the second computing device 106 (or counterparty), the financial account may be debited for the financial amount and the second computing device 106 may be notified by service provider network 120 and/or transaction server 122 that payment is approved. In particular, confirmation that the financial transaction was successfully completed may be communicated to the electronic device 102 via network 188. The confirmation can be provided to the computing device via a wireless connection. Then, the merchant payment applet in the computing device 104 may communicate the confirmation to the counterparty payment applet in the second computing device 106 via radios using the connection. Alternatively, if a Wi-Fi connection or a cellular-telephone network is available, service provider network 120 and/or transaction server 122 may communicate the confirmation to the second computing device 106. The application executed by the processor on the second computing device 106 may display the confirmation on a display so that the user of the second computing device 106 is alerted. In some embodiments, the confirmation may include digital-receipt information, such as: a status of the financial transaction (e.g., the financial transaction is complete), the merchant identifier, the financial amount of the financial transaction, an itemized list of one or more purchased items, links (such as uniform resource locators (URLs)) to information associated with products, advertising, discounts (such as coupons) for future purchases of at least one item, discounts for future purchases from the merchant in the financial transaction, accounting information (which can be used to account for expenses, such as an expense report), and sales-tax and/or income-tax information (which can be used to determine an income-tax return).

Note that the server 116, the service provider network 120 and/or transaction server 122 may have access to the decryption key(s) needed to decrypt and extract the information from the signed transaction blob. While we refer to entities such as "service provider network 120," and "transaction server 122," this is done for ease of description. What is meant by service provider network 120, etc., is hardware (server computers and related networking equipment) under the control of and/or otherwise performing actions on behalf of such entities.

In order to enhance security of the financial transaction, prior to providing the signed blob to the second computing device 106, the merchant payment applet may provide the signed blob to server 116 via the electronic device 102, and may receive a confirmation from server 116, via the electronic device, that the computing device 104 is authorized to conduct the financial transaction. For example, server 116 may determine if the computing device 104 is currently authorized to conduct the financial transaction based on the merchant identifier. Alternatively or additionally, as described further below with reference to FIG. 2, prior to receiving the transaction amount, an authentication application executed by a secure enclave processor in the processor on the computing device 104 may: receive authentication information associated with the user of the computing device 104; and authenticate the user based on the authentication information and stored authentication information on the computing device 104. Similarly, as described further below with reference to FIG. 2, prior to activating the counterparty payment applet an authentication application executed by a secure enclave processor in the processor on the second computing device 106 may: receive authentication information associated with the user of the second computing device 106; and authenticate the user based on the authentication information and stored authentication information on the second computing device 106.

Furthermore, after receiving the signed blob and prior to creating the signed transaction blob, the counterparty payment applet may decrypt the signed blob using a decryption key corresponding to the encryption key used to generate the signed blob. Thus, in some embodiments the second computing device 106 has access to this decryption key, and may forward a request to the application executed by the processor on the second computing device 106. This request may be displayed on the second computing device 106. In particular, the request may include the financial-transaction amount, and may request authorization from the user to conduct the financial transaction. In response, the user may provide the authorization, e.g., by activating a physical button or a virtual icon displayed on a multi-touch screen. After receiving the user's authorization, the counterparty payment applet may create the signed transaction blob and may perform the subsequent operations in the financial-transaction technique.

The wireless communication between computing devices 104, 106 may involve the exchange of packets that include the signed blob and the signed transaction blob. These packets may be included in frames in one or more wireless channels.

As described further below with reference to FIG. 2, exemplary computing device 200 (e.g., computing devices 104, 106) may include subsystems, such as a networking subsystem 214, a memory subsystem 212, a processing subsystem 210, and a secure subsystem 218. In addition, computing devices 104, 106 may include radios in the networking subsystems. More generally, computing devices 104, 106 can include (or can be included within) any electronic devices with networking subsystems that enable computing devices 104, 106 to wirelessly communicate with another electronic device. This can comprise transmitting frames on wireless channels to enable electronic devices to make initial contact, followed by exchanging subsequent data/management frames (such as connect requests to establish a connection), configuring security options (e.g., IP SEC), transmitting and receiving packets or frames, etc.

As can be seen in FIG. 1, wireless signals 114 are transmitted from a radio in the computing device 104. These wireless signals 114 are received by a radio in the second computing device 106. In the described embodiments, processing a packet or frame in either of computing devices 104, 106 includes: receiving wireless signals 114 with the packet or frame; decoding/extracting the packet or frame from received wireless signals 114 to acquire the packet or frame; and processing the packet or frame to determine information contained in the packet or frame (such as the signed blob or the signed transaction blob).

Although the environment shown in FIG. 1 is as an example, in alternative embodiments, different numbers or types of electronic devices and/or computing devices may be present. For example, some embodiments comprise more or fewer electronic devices and/or computing devices. As another example, in another embodiment, different electronic devices are transmitting and/or receiving packets or frames.

Figure 2:
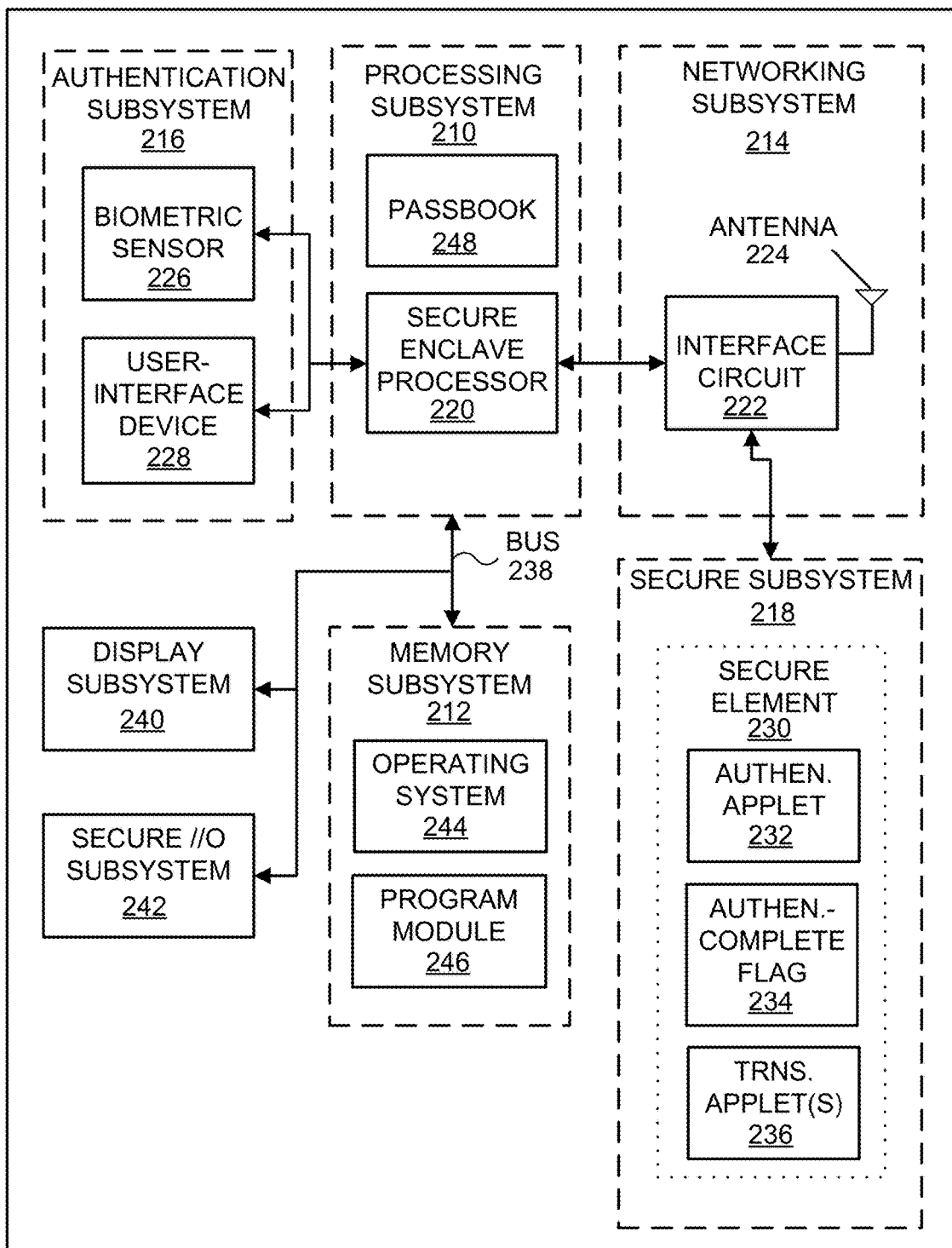
FIG. 2 is a block diagram illustrating one of the electronic devices of FIG. 1 in accordance with an embodiment of the present disclosure.

FIG. 2 presents a block diagram illustrating computing device 200, which may be the computing device 104 or 106 as shown in FIG. 1. The computing device 200 includes processing subsystem 210, memory subsystem 212, networking subsystem 214, authentication subsystem 216, and secure subsystem 218. Processing subsystem 210 includes one or more devices configured to perform computational operations. For example, processing subsystem 210 can include one or more microprocessors, application-specific integrated circuits (ASICs), microcontrollers, programmable-logic devices, and/or one or more digital signal processors (DSPs).

In addition, processing subsystem 210 may include a secure enclave processor 220. The secure enclave processor 220 can be a system-on-chip within one or more processors in processing subsystem 210 that performs security services for other components in the processing subsystem 210 and that securely communicates with other subsystems in computing device 200. Secure enclave processor 220 may include one or more processors, a secure boot read-only memory (ROM), one or more security peripherals, and/or other components. The security peripherals may be hardware-configured to assist in the secure services performed by secure enclave processor 220. For example, the security peripherals may include: authentication hardware implementing various authentication techniques, encryption hardware configured to perform encryption, secure-interface controllers configured to communicate over the secure interface to other components, and/or other components. In some embodiments, instructions executable by secure enclave processor 220 are stored in a trust zone in memory subsystem 212 that is assigned to secure enclave processor 220, and secure enclave processor 220 fetches the instructions from the trust zone for execution. Secure enclave processor 220 may be isolated from the rest of processing subsystem 210 except for a carefully controlled interface, thus forming a secure enclave for secure enclave processor 220 and its components. Because the interface to secure enclave processor 220 is carefully controlled, direct access to components within secure enclave processor 220 (such as a processor or a secure boot ROM) may be prevented. In some embodiments, secure enclave processor 220 encrypts and/or decrypts authentication information communicated with authentication subsystem 216, and encrypts and/or decrypts information (such as tokens) communicated with secure subsystem 218. Furthermore, secure enclave processor 220 may compare authentication information with stored authentication and, if a match is obtained, may provide an encrypted token with an authentication-complete indicator to a secure element 230.

Memory subsystem 212 includes one or more devices for storing data and/or instructions for processing subsystem 210, networking subsystem 214, authentication subsystem 216 and/or secure subsystem 218. For example, memory subsystem 212 can include dynamic random-access memory (DRAM), static random-access memory (SRAM), and/or other types of memory. In some embodiments, instructions for processing subsystem 210 in memory subsystem 212 include: one or more program modules or sets of instructions (such as program module 246, e.g., a digital wallet, a passbook and/or a mobile payments application), which may be executed by processing subsystem 210. Note that the one or more computer programs may constitute a computer-program mechanism. Moreover, instructions in the various modules in memory subsystem 212 may be implemented in: a high-level procedural language, an object-oriented programming language, and/or an assembly or machine language. Furthermore, the programming language may be compiled or interpreted, e.g., configurable or configured (which may be used interchangeably in this discussion), to be executed by processing subsystem 210.

In addition, memory subsystem 212 can include mechanisms for controlling access to the memory. In some embodiments, memory subsystem 212 includes a memory hierarchy that comprises one or more caches coupled to a memory in computing device 200. In some of these embodiments, one or more of the caches is located in processing subsystem 210.

In some embodiments, memory subsystem 212 is coupled to one or more high-capacity mass-storage devices (not shown). For example, memory subsystem 212 can be coupled to a magnetic or optical drive, a solid-state drive, or another type of mass-storage device. In these embodiments, memory subsystem 212 can be used by computing device 200 as fast-access storage for often-used data, while the mass-storage device is used to store less frequently used data.

Networking subsystem 214 includes one or more devices configured to couple to and communicate on a wired and/or wireless network (i.e., to perform network operations), including an interface circuit 222 (such as a near-field-communication circuit) and at least an antenna 224 (thus, there may be one or more antennas in computing device 200). For example, networking subsystem 214 can include a Bluetooth networking system, a cellular networking system (e.g., a 3G/4G network such as universal mobile telecommunications system (UMTS), Long Term Evolution (LTE), 5G New Radio, etc.), a universal serial bus (USB) networking system, a networking system based on the standards described in IEEE 802.11 (e.g., a Wi-Fi networking system), an Ethernet networking system, and/or another communication system (such as a near-field-communication system).

Networking subsystem 214 includes processors, controllers, radios/antennas, sockets/plugs, and/or other devices used for coupling to, communicating on, and handling data and events for each supported networking or communication system. Note that mechanisms used for coupling to, communicating on, and handling data and events on the network for each network system are sometimes collectively referred to as a "network interface" for the network system. Moreover, in some embodiments a "network" between the electronic devices does not yet exist. Therefore, computing device 200 may use the mechanisms in networking subsystem 214 for performing simple wireless communication between computing devices 104, 106 as shown in FIG. 1, e.g., transmitting advertising frames and/or near-field communication as described previously.

Authentication subsystem 216 may include one or more processors, controllers and devices for receiving the authentication information from a user of computing device 200, and for securely communicating this authentication information to processing subsystem 210 (e.g., by encrypting the authentication information). For example, the authentication information may include: a biometric identifier acquired by a biometric sensor 226 (such as: a fingerprint sensor, a retinal sensor, a palm sensor, a signature-identification sensor, etc.); a personal identification number (PIN) associated with one of transaction applets 236 (e.g., payment applets) that is received using a user-interface device 228 (such as a keypad, a touch-sensitive display, optical character recognition and/or voice recognition); and a passcode for unlocking at least some functionality of computing device 200 that is received using user-interface device 228.

Furthermore, secure subsystem 218 may include a secure element 230, which includes one or more processors and memory. Note that secure element 230 may be a tamper-resistant component that is used in computing device 200 to provide the security, confidentiality, and multiple application environments required to support various business models. Secure element 230 may exist in one or more of a variety of form factors, such as: a universal integrated circuit card (U/CC), an embedded secure element (on a circuit board in computing device 200), a smart secure digital (SD) card, a smart microSD card, etc.

Moreover, secure element 230 may include one or more applets or applications that execute in an environment of secure element 230 (such as in the operating system of secure element 230, and/or in a Java runtime environment executing on the secure element 230). For example, the one or more applets may include an authentication applet 232 that: performs contactless registry services, encrypts/decrypts packets or tokens communicated with secure enclave processor 220, sets one or more software flags (such as an authentication-complete flag 334) in an operating system of secure element 230, and/or conveys information to one or more payment applets 236 via shareable interface objects. While a shareable interface object is used as an illustrative example in the present discussion, in other embodiments different mechanisms may be used, such as global services, remote method invocation (RMI), etc. In addition, the one or more applets may include one or more payment applets 236 that conduct financial transactions when they are activated by program module 246, and based on the one or more software flags and/or when the computing device 104 is proximate to the second computing device 106 as shown in FIG. 1.

Authentication applet 232 may execute in a master or issuer security domain in secure element 230, while payment applets 236 may execute in supplemental security domains. Communication between these security domains may be encrypted using different encryption/decryption keys that are security-domain specific. In computing device 200 and/or during communication between computing devices 104, 106 as shown in FIG. 1, encryption/decryption may involve symmetric and/or asymmetric encryption. In addition, the information communicated may also include a digital signature that is specific to computing device 200 and/or components in computing device 200.

Figure 3:
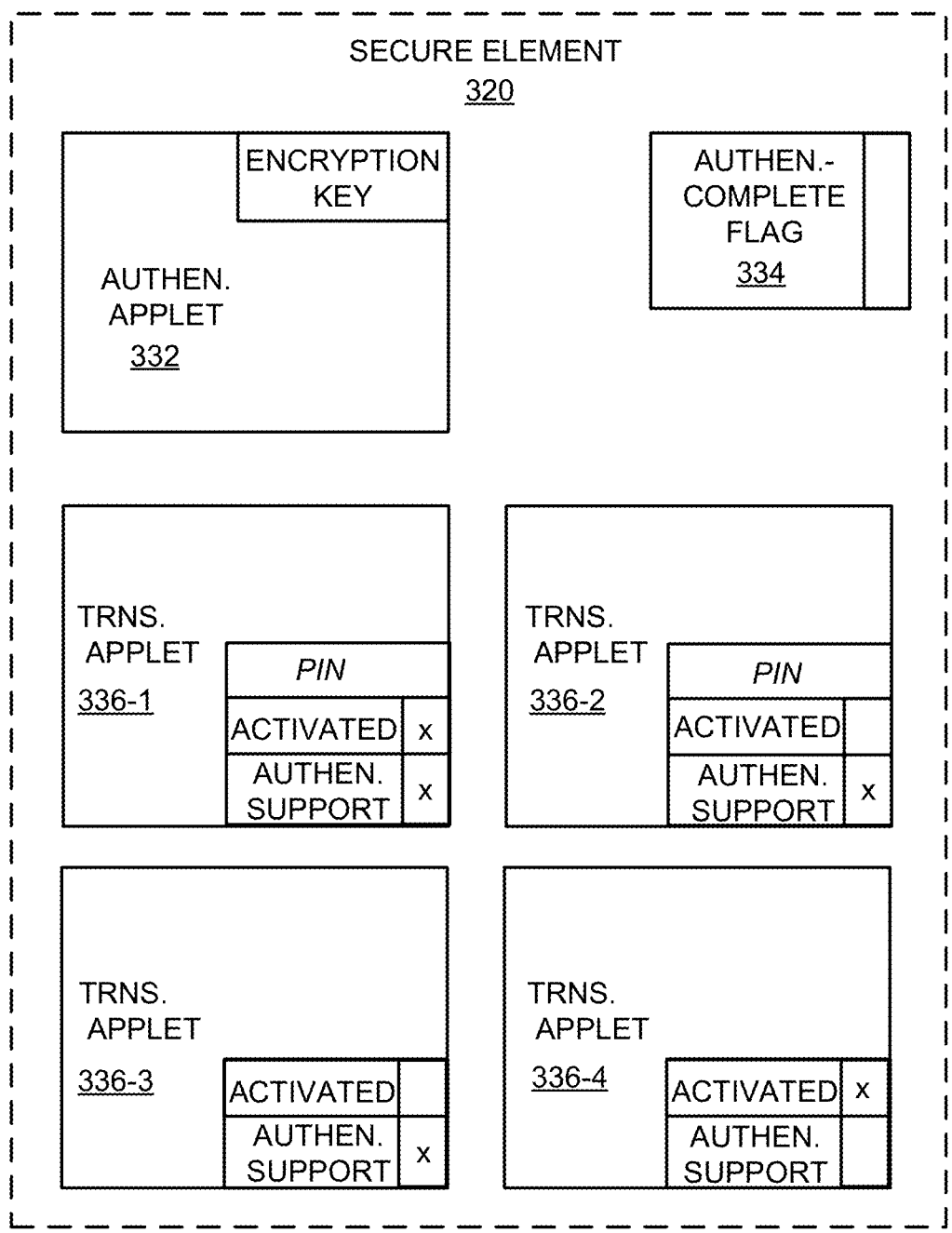
FIG. 3 is a block diagram illustrating the secure element in the electronic device in FIG. 2 in accordance with an embodiment of the present disclosure.

The data stored in secure element 330 is further illustrated in FIG. 3. In particular, for each of transaction applets 336-1, 336-2, 336-3, 336-4, 336-N (e.g., payment applets, and collectively payment applets 336), secure element 330 may store: whether a given payment applet is active (in response to an activation command); and whether or not authentication-complete flag 334 is supported by/applies to the given payment applet. In some embodiments, there are one or more payment applets (such as payment applet 336-4) for which authentication-complete flag 334 does not apply. In some embodiments, secure element 330 stores, for at least one of payment applets 336, a PIN (such as a debit-card number) that is associated with this payment applet. For example, as shown in FIG. 3, payment applets 336-1 and 336-2 may store associated PINs. Additionally, one or more of the payment applets may store associated financial-account information.

In embodiments where computing device 200 performs the functions of the computing device 104 in FIG. 1, the user may use passbook 248 to select or activate the merchant payment applet, which is one of payment applets 236. Moreover, passbook 248 may display a request for the transaction amount on display subsystem 240. In response, the user may enter the transaction amount using user-interface device 228 (such as a physical keyboard, a virtual keyboard displayed on a multi-touch screen, etc.). Passbook 248 may forward the transaction amount to the merchant payment applet on secure element 230 via secure enclave processor 220 and networking subsystem 214. Then, the merchant payment applet generates the signed blob based on the transaction amount, the merchant identifier and, optionally, the transaction identifier using the encryption key and the digital signature.

When the second computing device 106 as shown in FIG. 1 is proximate to computing device 200 (e.g., based on a received signal strength), interface circuit 222 may notify the merchant payment applet. In response, the merchant payment applet may, via interface circuit 222 and antenna 224, transmit the connection information to the second computing device 106 as shown in FIG. 1 using near-field communication. In addition, interface circuit 222 and antenna 224 may receive the additional connection information for the second computing device 106 as shown in FIG. 1.

In response, the merchant payment applet may instruct interface circuit 222 to establish the connection with the second computing device 106 as shown in FIG. 1 based on the additional connection information. Concurrently, the merchant payment applet communicates, via interface circuit 222 and antenna 224, the signed blob to the second computing device 106 using near-field communication.

When interface circuit 222 and antenna 224 receive the signed transaction blob via the connection, the merchant payment applet may instruct interface circuit 222 to provide the signed transaction blob to server 116 via the electronic device 102 and the network 118 as shown in FIG. 1 and/or service provider network 120 as shown in FIG. 1 to conduct the financial transaction. Subsequently, interface circuit 222 and antenna 224 may receive the confirmation, which is provided to the merchant payment applet.

Next, the merchant payment applet may instruct interface circuit 222 to communicate the confirmation to the second computing device 106 as shown in FIG. 1 using the connection. In addition, the merchant payment applet may provide the confirmation to passbook 248 via networking subsystem 214 and secure enclave processor 220. Passbook 248 may display the confirmation on display subsystem 240, thereby alerting the user of computing device 200 that the financial transaction is complete.

As noted previously, in order to enhance security of the financial transaction, prior to providing the signed blob to the second computing device 106 via the network 118 and the electronic device 102 as shown in FIG. 1, the merchant payment applet may, via interface circuit 222 and antenna 224, provide the signed blob to server 116 as shown in FIG. 1. Subsequently, interface circuit 222 may receive the confirmation from server 116 as shown in FIG. 1 that computing device 200 is authorized to conduct the financial transaction. This confirmation may be provided to the merchant payment applet. Alternatively or additionally, prior to receiving the transaction amount, the authentication application executed by secure enclave processor 220 (or passbook 248) may: receive the authentication information associated with the user of computing device 200 from authentication subsystem 216; and authenticate the user based on the authentication information and stored authentication information on the computing device 104 as shown in FIG. 1. Then, the authentication application may instruct authentication applet 332 to set or enable authentication-complete flag 334. In particular, if the merchant payment applet supports authentication-complete flag 334 (as indicated by the enabling or setting of authentication support in the merchant payment applet), in order for the merchant payment applet to conduct a financial transaction with the second computing device 106 as shown in FIG. 1, the merchant payment applet may need to be activated and authentication-complete flag 334 may need to be set or enabled in secure element 320 (indicating that the user has been authenticated). While the present discussion illustrates the use of a global authentication-complete flag 334, note that in some embodiments there are separate authentication-complete flags associated with at least some of the payment applets 336.

In embodiments where computing device 200 performs the functions of the second computing device 106 in FIG. 1, the user may use passbook 248 to select or activate the counterparty payment applet, which is one of payment applets 236. Subsequently, the user may position computing device 200 proximate to the computing device 104 as shown in FIG. 1. After receiving the connection information, interface circuit 222 and antenna 224 may transmit the additional connection information to the computing device 104 as shown in FIG. 1 using near-field communication.

While establishing the connection using the connection information, interface circuit 222 may receive the signed blob using near-field communication. This signed blob may be provided to the counterparty payment applet. In response, the counterparty payment applet may create the signed transaction blob based on the signed blob and the financial-account information associated with the counterparty payment applet using another encryption key. The encryption key may not be different than the encryption key used by the computing device 104 as shown in FIG. 1 and another digital signature.

Next, the counterparty payment applet may, via interface circuit 222 and antenna 224, communicate the signed transaction blob to the computing device 104 as shown in FIG. 1 using the connection. Furthermore, interface circuit 222 may receive the confirmation that the financial transaction is complete from the computing device 104 as shown in FIG. 1 using the connection. The counterparty payment applet may provide the confirmation to passbook 248 via networking subsystem 214 and secure enclave processor 220. Passbook 248 may display the confirmation on display subsystem 240, thereby alerting the user of computing device 200 that the financial transaction is complete.

As noted previously, in order to enhance security of the financial transaction, prior to activating the counterparty payment applet, an authentication application executed by secure enclave processor 220 (or passbook 248) may: receive authentication information associated with the user of computing device 200; and authenticate the user based on the authentication information and stored authentication information on computing device 200. Furthermore, after receiving the signed blob and prior to creating the signed transaction blob, the counterparty payment applet may decrypt the signed blob using a decryption key corresponding to the encryption key used by the computing device 104 as shown in FIG. 1 to generate the signed blob, and may forward the request, via networking subsystem 214 and secure enclave processor 220, to passbook 248. This request, with the financial-transaction amount, may be displayed on display subsystem 240 and may request authorization from the user to conduct the financial transaction. In response, the user may provide the authorization using user-interface device 228, e.g., by activating a physical button or a virtual icon displayed on a multi-touch screen. Passbook 248 may provide the authorization to the counterparty payment applet, which then creates the signed transaction blob and performs the subsequent operations in the financial-transaction technique.

Within computing device 200, processing subsystem 210, memory subsystem 212, networking subsystem 214, authentication subsystem 216 and secure subsystem 218 may be coupled together using one or more interconnects, such as bus 238. These interconnects may include an electrical, optical, and/or electro-optical connection that the subsystems can use to communicate commands and data among one another. Note that different embodiments can include a different number or configuration of electrical, optical, and/ or electro-optical connections among the subsystems. In some embodiments, computing device 200 can detect tampering with secure components (such as secure enclave processor 220, secure element 230 and/or bus 238) and may destroy encryption/decryption keys or authentication information (such as a stored biometric identifier) if tampering is detected.

In some embodiments, the computing device 200 includes a display subsystem 240 for displaying information on a display, which may include a display driver and the display, such as a liquid-crystal display, a multi-touch touchscreen, etc. In addition, in some embodiments, the computing device 200 includes a secure input/output (I/O) subsystem 242 (such as a keypad) for receiving the PIN of the user that is associated with one of payment applets 236. As noted previously, display subsystem 240 and/or secure I/O subsystem 242 may be included in authentication subsystem 216.

Computing device 200 can include at least one network interface. For example, computing device 200 can be (or can be included in): a desktop computer, a laptop computer, a server, a media player (such as an MP3 player), an appliance, a subnotebook/netbook, a tablet computer, a smartphone, a cellular telephone, a piece of testing equipment, a network appliance, a set-top box, a personal digital assistant (PDA), a toy, a controller, a digital signal processor, a game console, a computational engine within an appliance, a consumer-electronic device, a portable computing device, a personal organizer, and/or another electronic device.

Although specific components are used to describe computing device 200, in alternative embodiments, different components and/or subsystems may be present in computing device 200. For example, computing device 200 may include one or more additional processing subsystems, memory subsystems, networking subsystems, authentication subsystems, secure subsystems, display subsystems and/or secure I/O subsystems. Additionally, one or more of the subsystems may not be present in computing device 200. Moreover, in some embodiments, computing device 200 may include one or more additional subsystems that are not shown in FIG. 2. For example, computing device 200 can include, but is not limited to, a data collection subsystem, an audio and/or video subsystem, an alarm subsystem, and/or a media processing subsystem. Also, although separate subsystems are shown in FIG. 2, in some embodiments, some or all of a given subsystem or component can be integrated into one or more of the other subsystems or components in computing device 200. For example, in some embodiments, program module 246 is included in operating system 244. Alternatively or additionally, at least some of the functionality of program module 246 may be included in passbook 248.

Moreover, the circuits and components in computing device 200 may be implemented using any combination of analog and/or digital circuitry, including: bipolar, P-channel metal-oxide-semiconductor (PMOS) and/or n-channel metal-oxide semiconductor (NMOS) gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 214 (such as a radio) and, more generally, some or all of the functionality of computing device 200. Moreover, the integrated circuit may include hardware and/or software mechanisms that are used for transmitting and receiving wireless signals. Aside from the mechanisms herein described, radios are generally known in the art and hence are not described in detail. In general, networking subsystem 214 and/or the integrated circuit can include any number of radios. Note that the radios in multiple-radio embodiments function in a similar way to the radios described in single-radio embodiments.

In some embodiments, networking subsystem 214 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. Note that "monitoring" as used herein comprises receiving signals from other electronic devices and possibly performing one or more processing operations on the received signals, e.g., determining if the received signal comprises an advertising frame, etc.

While communication protocols compatible with a near-field communication standard or specification and Bluetooth were used as an illustrative example, the described embodiments of the financial-transaction techniques may be used in a variety of network or communication interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both.

Additionally, while the preceding discussion focused on the hardware, software and functionality in computing device 200, server 116 as shown in FIG. 1, and/or service provider network 120 as shown in FIG. 1 may have the same or similar hardware (processors, memory, networking interfaces, etc.) and/or software to support the operations performed by these entities, as described further below with reference to FIGS. 4-8. In particular, these entities may include one or more computer systems with a processing subsystem that executes one or more program modules stored in a memory subsystem to perform the operations, and one or more networking interfaces for communicating with other electronic devices, such as computing device 200.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer readable medium for storage and/or transmission, suitable media include random access memory (RAM), a read-only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the described techniques may be created using a data signal encoded with such programs. Computer readable media encoded with the program code may be packaged with a compatible device or provided separately from other devices (e.g., via Internet download). Any such computer readable medium may reside on or within a single computer program product (e.g., a hard drive or an entire computer system), and may be present on or within different computer program products within a system or network. A computer system may include a monitor, printer, or other suitable display for providing any of the results mentioned herein to a user.

Figure 4:
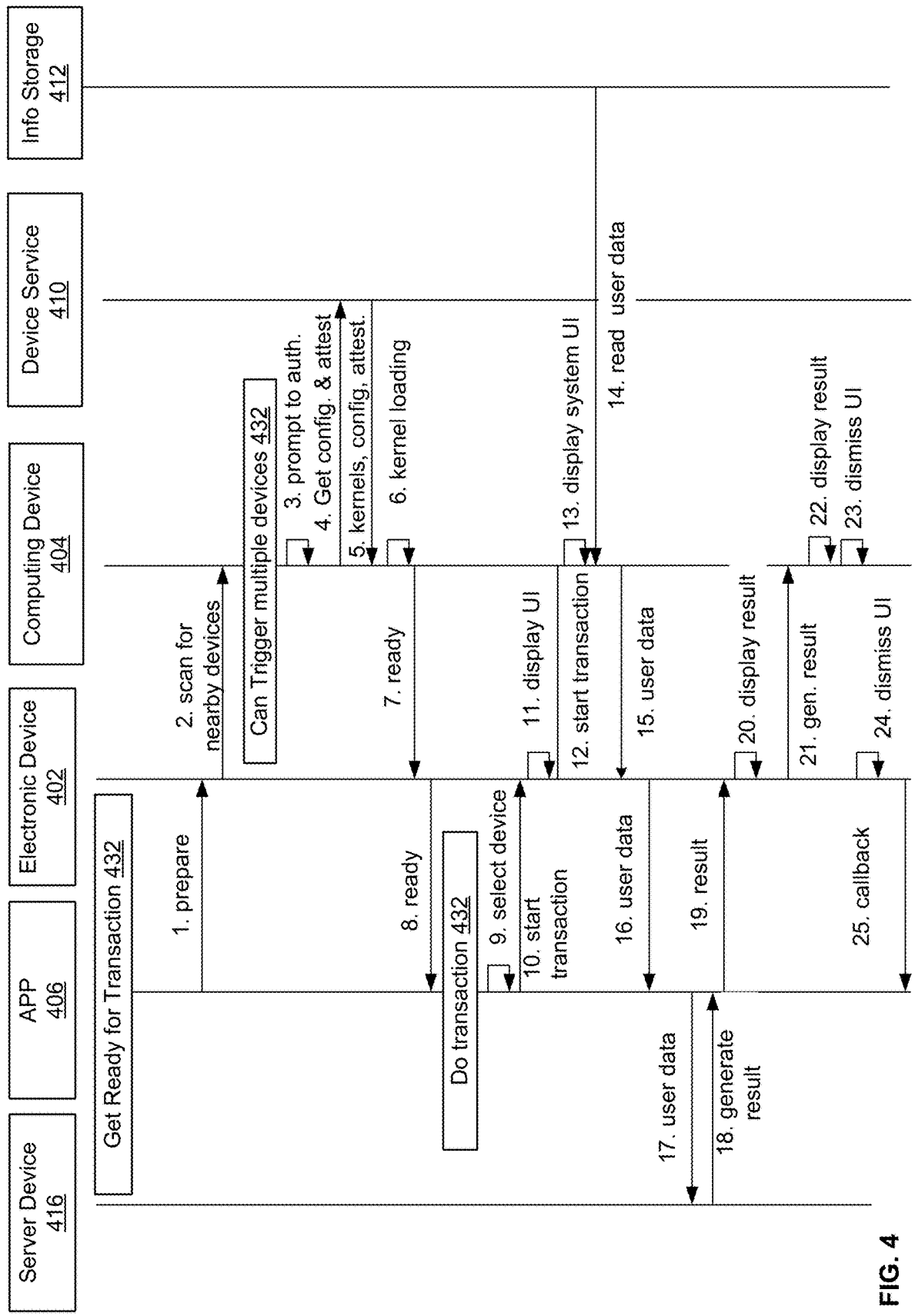
FIG. 4 is a flow diagram illustrating a method for conducting a secure data transfer using one of the electronic devices in FIG. 1 in accordance with an embodiment of the present disclosure.

FIG. 4 is a swim lane diagram illustrating a method for conducting a secure data transfer using one of the electronic devices in FIG. 1 in accordance with an embodiment of the present disclosure. In various embodiments the components of the system can include an electronic device 402, a computing device 404, an application (e.g., App) 406, a device service 410, an information storage location (e.g., electronic card/wallet) 412, and a server device 416.

The electronic device 402 is described above with respect to the electronic device 102 as described for FIG. 1 above. The computing device 404 is described above with respect to computing device 104 as described above. The service App 406 is an application that can be executed on the electronic device 402. The service App 406 can include several applications that concern the secure receipt of data. In various embodiments, the service App 406 can be a vendor's payment system. In other embodiments, the service App 406 can include an application for receiving secure identification information (e.g., digital driver's licenses). In other embodiments, the service App 406 can include an application for receiving secure information for an event (e.g., electronic tickets).

The server device 16 can receive the secure information (e.g., digital identification, electronic pass, payment) and verify the secure information using information stored on the database. The card/wallet 412 can allow the user to store the secure information. In various embodiments a card comes with an embedded electronic chip (e.g., NFC chip). The embedded electronic chip can store the secure information which can be retrieved by the computing device 404 via wireless communication. The wallet 412 application can store the secure information. The wallet application can work with various radios on the computing device 404 to transfer the secure information to the electronic device 402.

At 430, the application 406 on the electronic device 402 executes a routine for the secure transmission of user information. The routine can prepare the electronic device 402 to receive the secure information. The application 406 can prompt a user to select a device capable of receiving the secure information from one or more compatible devices (e.g., using a drop-down menu).

The routine can prompt the electronic device 402 to scan for nearby devices.

At 432, the scanning may trigger several devices within communication range of the electronic device 402. In various embodiments, the routine can prompt a ranging module to conduct ranging with one or more computing devices (e.g., computing device 404) to determine range between the one or more computing devices 404 and the electronic device 402. The one or more computing devices 404 may be detected by Bluetooth (or similar wireless protocols) and the ranging can be conducted using a different protocol (e.g., UWB). In various embodiments, the computing device 404 with the shortest range may be automatically selected to receive the secure information. For example, if the computing device 404 is a wearable device worn by a merchant, it would be desirable for the electronic device 102 to trigger only the wearable device associated with the merchant. This association can be accomplished via the pairing process. This association can also be associated by range (e.g., closest distance) of the computing device 404 to the electronic device 402.

The electronic device 402 can prompt the selected computing device 404 to prepare to receive the secure information. For transactions using a secure data exchange module (e.g., the NFC protocol) the computing device 404 will need to prepare for receiving the secure information. The electronic device 402 can trigger the provisioning of the secure data exchange module. As part of the provisioning process, the secure data exchange module and computing device can perform an attestation with a device service 410 that scans and looks for malware prior to receiving secure information. The attestation process needs to reach out to the remote server and receive a certificate back confirming that attestation has been completed. The attestation process can be done in the background so the secure data exchange module is ready when needed. Attestation can be done periodically (e.g., every 15 minutes). In various embodiments, the computing device 404 can display a user interface to prompt the user to authorize the use of the computing device 404 to receive secure information.

As part of the provisioning process, the computing device 404 can verify that the applet is loaded for the secure data exchange module. The applet (e.g., a kernel) is the computer program at the core of the secure data exchange module device (e.g., NFC device) operating system and is the portion of the operating system that is always in memory. In addition, the computing device 404 can load the configuration for the secure data exchange module. The configuration can include information regarding the service provider or merchant (e.g., the name of the service provider). After the applet and configuration data is loaded, the computing device 404 can send a message to the electronic device that the computing device 404 is ready to receive the secure information. The electronic device 402 can provide this ready indication to the application 406.

At 434, the secure transfer of data can occur. In various embodiments, the application 406 can allow the electronic device to automatically select the computing device 404 for receiving the user information. The application 406 can send instructions to the electronic device 402 to start the transaction. The electronic device 402 can present a user interface for conducting the secure transaction. The user interface can allow the user to select the computing device 404 for receiving the user information. The electronic device 402 can send a message with instructions to the computing device 404 to commence the transaction. In various embodiments, the computing device 404 can present a user interface to prompt a user to provide the user information. The computing device 404 can read the secure information from the card/wallet 412. In various embodiments, the user information via the secure data exchange module (e.g., the NFC protocol). The user information can be encrypted using a secure element on the computing device 404 as discussed above. The user data can be sent to the electronic device 402 using a wireless protocol. The electronic device 402 can allow the application 406 to access the user information. The electronic device 402 can send the user information to the server device 416 for verification and/or confirmation. For example, in the payment context, the verification step solicits authorization for the payment from a financial institution. After the server device 416 has verified and/or confirmed the information a result can be generated. The result can be payment confirmation information.

The result information can be sent to the electronic device 402. In various embodiments, the result can be displayed by the application 406 on a user interface of the electronic device 402. The result can be transmitted to the computing device 404. The computing device 404 can display the result. The computing device 404 can dismiss the user interface after the result is displayed. The electronic device 402 can display the user interface after the result is displayed. A callback confirmation can be received by the application 406 to confirm that the user interface was dismissed so the application 406 can move onto other operations.

Figure 5:
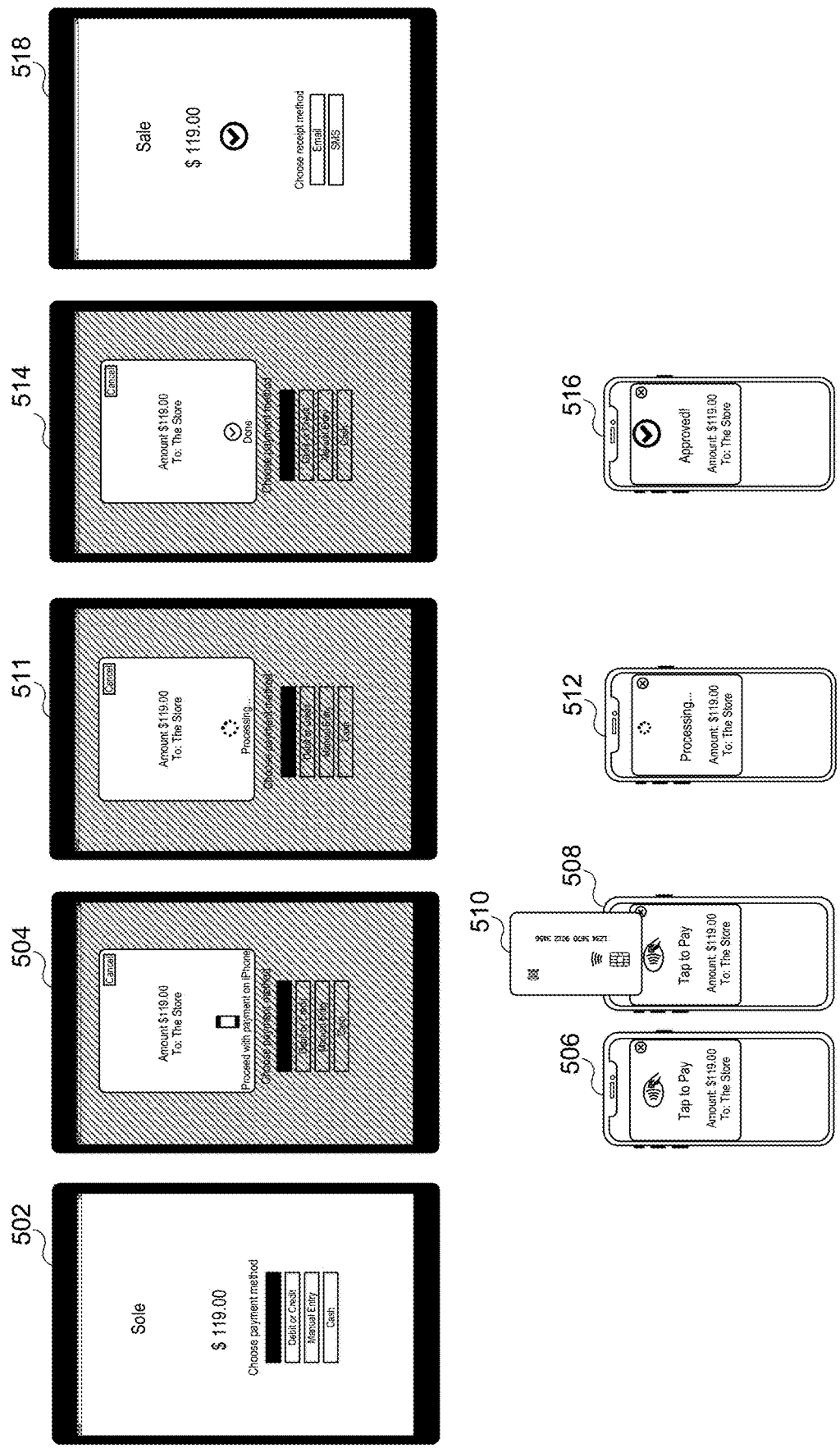
FIG. 5 illustrates a sequence diagram for an exemplary technique.

FIG. 5 illustrates a sequence diagram for an exemplary technique (e.g., a secure payment). At step 502, the electronic device can present a user interface to allow a user (e.g., a merchant) to select the payment method. For example, the user can select "Other device," debit or credit card, manual entry, or cash. The user interface can display the transaction amount.

At step 504, the electronic device can prompt the user to proceed with payment on the computing device (e.g., an iPhone). At step 506, the computing device can present a user interface on the display of the computing device. For example, for NFC payments, the display may indicate the amount, the merchant and instructions to "Tap to Pay." In various embodiments, the user interface may display the NFC symbol as an indication of where to tap the second mobile device or card. At step 508, a user can tap a payment card, 510, on the display of the computing device. As described above, the user information (e.g., payment information) can be received by the secure data exchange module. The user information can be transmitted to the electronic device.

At step 511, the electronic device can receive the user information. In various embodiments, the display may indicate that the data is processing. The user information can be sent to a server device as described above for FIG. 4. At step 512, the computing device can also indicate that the payment is processing. The server device can authorize the user information and send a confirmation back to the electronic device. In various embodiments, the server device can reach out to a financial institution for authorization.

At step 514, the electronic device can receive confirmation that the transaction has been authorized. In various embodiments, the user interface of the electronic device may display "Done" after the authorization has been received. The electronic device can send a message to the computing device indicating that the transaction has been authorized. At step 516, the computing device can display an indication of approval (e.g., "Approved") after the authorization has been received.

At 518, the electronic device can display a user interface prompting a user to select the method of receipt (e.g., email or SMS message).

Figure 6:
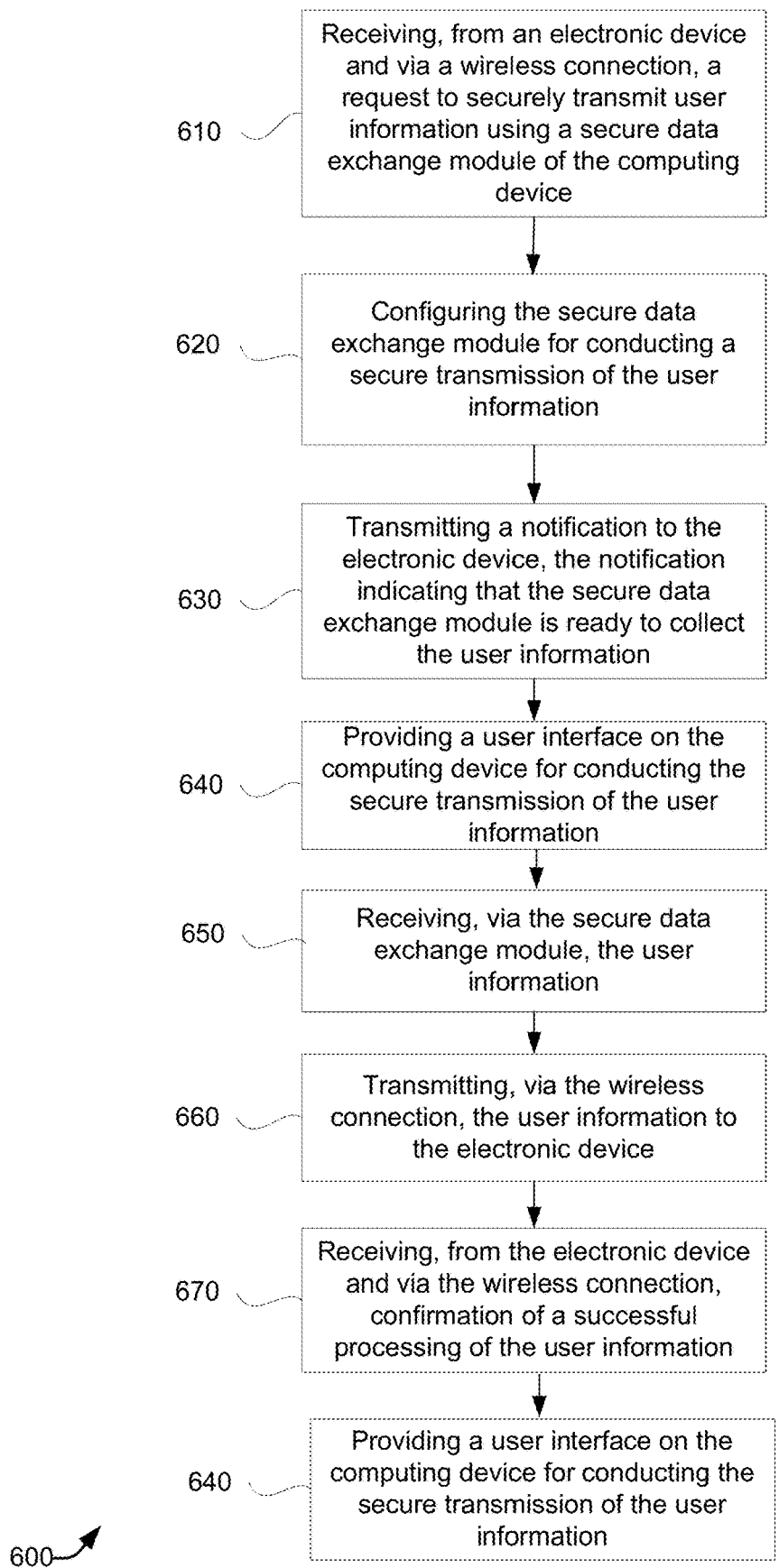
FIG. 6 is a flow diagram illustrating a method for conducting a secure data transfer using a computing device in FIG. 1 in accordance with an embodiment of the present disclosure.

FIG. 6 is a flow diagram illustrating a method for conducting a secure data transfer using a computing device in FIG. 1 in accordance with an embodiment of the present disclosure.

FIG. 6 is a flowchart of an example process 600 associated with techniques for secure data transmission using a secondary device. In some implementations, one or more process blocks of FIG. 6 may be performed by a computing device (e.g., computing device 200). In some implementations, one or more process blocks of FIG. 6 may be performed by another device or a group of devices separate from or including the computing device, such as computing device 104 or second computing device 106, card 108, and server 116 as shown in FIG. 1. Additionally, or alternatively, one or more process blocks of FIG. 6 may be performed by one or more components of computing device 200, such as processing subsystem 210, authentication subsystem 216, networking subsystem 214, display subsystem 240, memory subsystem 212, and secure subsystem 218, bus 238, and secure I/O subsystem 242.

At block 610, process 600 may include receiving, from an electronic device and via a wireless connection, a request to securely transmit user information using a secure data exchange module of the computing device. For example, the computing device may receive, from an electronic device and via a wireless connection (e.g., Bluetooth, Wi-Fi), a request to securely transmit user information using a secure data exchange module of the computing device, as described above. The wireless connection can include an NFC protocol. The user information can include payment information, identification information, key information, or ticket information.

At block 620, process 600 may include configuring the secure data exchange module for conducting a secure transmission of the user information. For example, the computing device may configure the secure data exchange module for conducting a secure transmission of the user information, as described above. The configuring of the secure data exchange module can include but is not limited to submitting attestation for approval and receiving a token, loading applet applications, configuring the module with vendor specific information.

At block 630, process 600 may include transmitting a notification to the electronic device, the notification indicating that the secure data exchange module is ready to collect the user information. For example, the computing device may transmit a notification to the electronic device, the notification indicating that the secure data exchange module is ready to collect the user information, as described above. The notification can include a message transmitted via a wireless protocol (e.g., Bluetooth, BLE, or Wi-Fi).

At block 640, process 600 may include providing a user interface on the computing device for conducting the secure transmission of the user information. For example, the computing device may provide a user interface on the computing device for conducting the secure transmission of the user information, as described above. The user interface can provide one or more user selectable icons to manage the secure transmission of the user information. The one or more user selectable icons may be displayed on a touch screen display. One of the user selectable icons may prompt the user to tap the computing device to transfer the user information (e.g., "tap to pay" or "tap to transfer"). The user interface may display the status of the application or the status of authorizing payment information.

At block 650, process 600 may include receiving, via the secure data exchange module, the user information. For example, the computing device may receive, via the secure data exchange module, the user information, as described above. The secure data exchange module can be an NFC module that can receive the user information via a wireless protocol.

At block 660, process 600 may include transmitting, via the wireless connection, the user information to the electronic device. For example, the computing device may transmit, via the wireless connection, the user information to the electronic device, as described above. The wireless connection can be Bluetooth, BLE, Wi-Fi, Zigbee, or some other wireless protocol for the transfer of data.

At block 670, process 600 may include receiving, from the electronic device and via the wireless connection, confirmation of a successful processing of the user information. For example, the computing device may receive, from the electronic device and via the wireless connection, confirmation of a successful processing of the user information, as described above. The wireless connection can be Bluetooth, BLE, Wi-Fi, Zigbee, or some other wireless protocol for the transfer of data.

At block 680, process 600 may include providing, via the user interface, an indication of the confirmation of the successful processing of the user information. For example, the computing device may provide, via the user interface, an indication of the confirmation of the successful processing of the user information, as described above. The user interface may indicate that the transaction is approved.

Process 600 may include additional implementations, such as any single implementation or any combination of implementations described below and/or in connection with one or more other processes described elsewhere herein.

In a first implementation, process 600 includes receiving a user input authorizing the computing device to conduct the secure transmission of the user information.

In a second implementation, alone or in combination with the first implementation, the electronic device and the computing device are paired.

In a third implementation, alone or in combination with one or more of the first and second implementations, the electronic device and the computing device utilize a same user account.

In a fourth implementation, alone or in combination with one or more of the first through third implementations, the secure data exchange module uses near field communication protocol.

In some examples, the electronic device is configured to transmit the user information to a service provider.

In some examples, the electronic device is configured to receive a configuration from a service provider.

In a fifth implementation, alone or in combination with one or more of the first through fourth implementations, configuring the secure data exchange module comprises verifying an applet is loaded, verifying a configuration is updated, and verifying an attestation is conducted.

In a sixth implementation, alone or in combination with one or more of the first through fifth implementations, process 600 includes receiving at least one of a biometric input or a code from a user, and authenticating the user based at least in part on the biometric input or the code prior to transmitting the information to the electronic device.

In a seventh implementation, alone or in combination with one or more of the first through sixth implementations, the one or more instructions, that cause the computing device to configure the secure data exchange module, cause the computing device to verify an applet is loaded, verify a configuration is updated, and verify an attestation is conducted.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
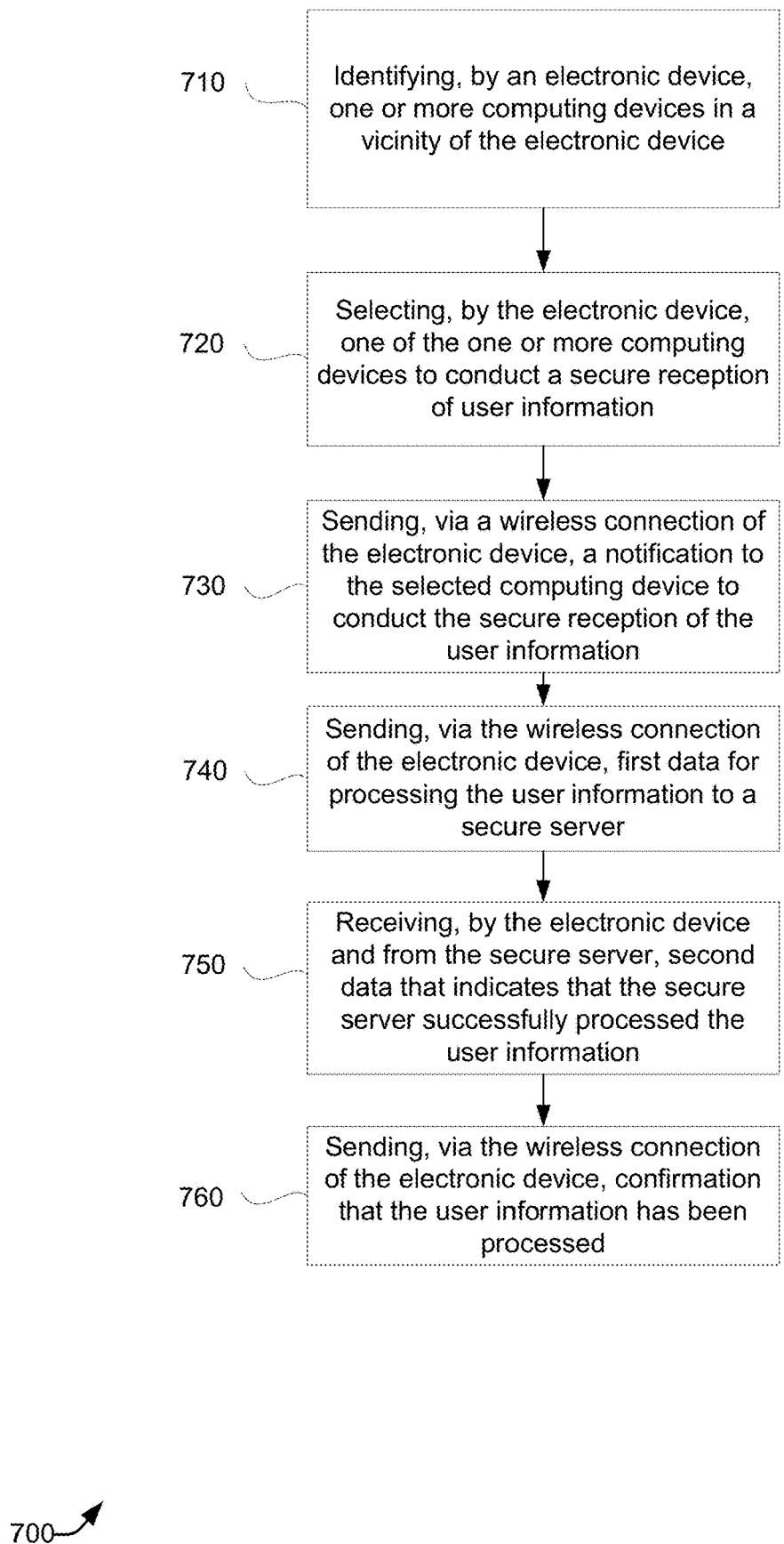
FIG. 7 is a flow diagram illustrating a method for conducting a secure data transfer using an electronic device in FIG. 1 in accordance with an embodiment of the present disclosure.

FIG. 7 is a flow diagram illustrating a method for conducting a secure data transfer using an electronic device in FIG. 1 in accordance with an embodiment of the present disclosure. FIG. 7 is a flowchart of an example process 700 associated with techniques for secure data reception using a user device. In some implementations, one or more process blocks of FIG. 7 may be performed by an electronic device (e.g., electronic device 1100). In some implementations, one or more process blocks of FIG. 7 may be performed by another device or a group of devices separate from or including the electronic device, such as computing device 104 or second computing device 106, card 108, and server 116 as shown in FIG. 1. Additionally, or alternatively, one or more process blocks of FIG. 7 may be performed by one or more components of device 1100, such as processor 1118, computer-readable medium 1102, input/output subsystems 1106, ranging module 1128, and/or wireless circuitry 1108.

At block 710, process 700 may include identifying one or more computing devices in a vicinity of the electronic device. For example, the electronic device may identify one or more computing devices in a vicinity of the electronic device, as described above. The electronic device may allow a user to select the computing device via a user interface. The electronic device may include a ranging device (e.g., UWB ranging) to conduct a ranging session with one or more computing devices in a vicinity of the electronic device. One or more ranging sessions can determine a distance between the electronic device and the one or more computing devices.

At block 720, process 700 may include selecting one of the one or more computing devices to conduct a secure reception of user information. For example, the electronic device may select one of the one or more computing devices to conduct a secure reception of user information, as described above. In various embodiments, the computing device can be selected by the electronic device based at least in part on the range. For example, the electronic device can select the computing device closest in range to the electronic device. In various embodiments, the electronic device can select a computing device that is paired with the electronic device (e.g., a wearable device).

At block 730, process 700 may include sending, via a wireless connection of the electronic device, a notification to the selected computing device to conduct the secure reception of the user information. For example, the electronic device may send, via a wireless connection of the electronic device, a notification to the selected computing device to conduct the secure reception of the user information, as described above. The notification message can be sent via wireless connection (e.g., Bluetooth, BLE, Wi-Fi). The electronic device can receive the user information via the wireless connection.

At block 740, process 700 may include sending, via the wireless connection of the electronic device, first data for processing the user information to a secure server. For example, the electronic device may send, via the wireless connection of the electronic device, first data for processing the user information to a secure server, as described above. The first data can be sent to the secure server via wireless connection (e.g., Bluetooth, BLE, Wi-Fi). The first data can be the user information as described above. In payment context, the first data can be user financial information for payment (e.g., payment card information).

At block 750, process 700 may include receiving, from the secure server, second data that indicates that the secure server successfully processed the user information. For example, the electronic device may receive, from the secure server, second data that indicates that the secure server successfully processed the user information, as described above. The second data can be the confirmation information as described about. For example, in the payment context, the confirmation information can be authorization from a financial institution for the transaction. The second data can be transmitted from the secure sever to the electronic device via a wireless connection (e.g., Bluetooth, BLE, Wi-Fi). In various embodiments, the electronic device can display the confirmation on the display.

At block 760, process 700 may include sending, via the wireless connection of the electronic device, confirmation that the user information has been processed. For example, the electronic device may send, via the wireless connection of the electronic device, confirmation that the user information has been processed, as described above. The second data can be transmitted from the electronic device to the computing device via a wireless connection (e.g., Bluetooth, BLE, Wi-Fi). In various embodiments, the computing device can display the confirmation on the display of the computing device.

Process 700 may include additional implementations, such as any single implementation or any combination of implementations described below and/or in connection with one or more other processes described elsewhere herein.

In a first implementation, the electronic device and the selected computing device are paired.

In a second implementation, alone or in combination with the first implementation, the electronic device and the selected computing device utilize a same user account.

In a third implementation, alone or in combination with one or more of the first and second implementations, the secure reception of user information uses near field communication protocol.

In a fourth implementation, alone or in combination with one or more of the first through third implementations, the selected computing device is configured to transmit the user information to a service provider.

In a fifth implementation, alone or in combination with one or more of the first through fourth implementations, the selecting of the one or more computing devices to conduct the secure reception of user information is done automatically.

In a sixth implementation, alone or in combination with one or more of the first through fifth implementations, the selection of the one or more computing devices to conduct the secure reception of user information is based at least in part on a range between the electronic device and the computing device.

In a seventh implementation, alone or in combination with one or more of the first through sixth implementations, process 700 includes receiving at least one of a biometric input or a code from a user, and authenticating the user based at least in part on the biometric input or the code prior to transmitting the user information to the electronic device Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
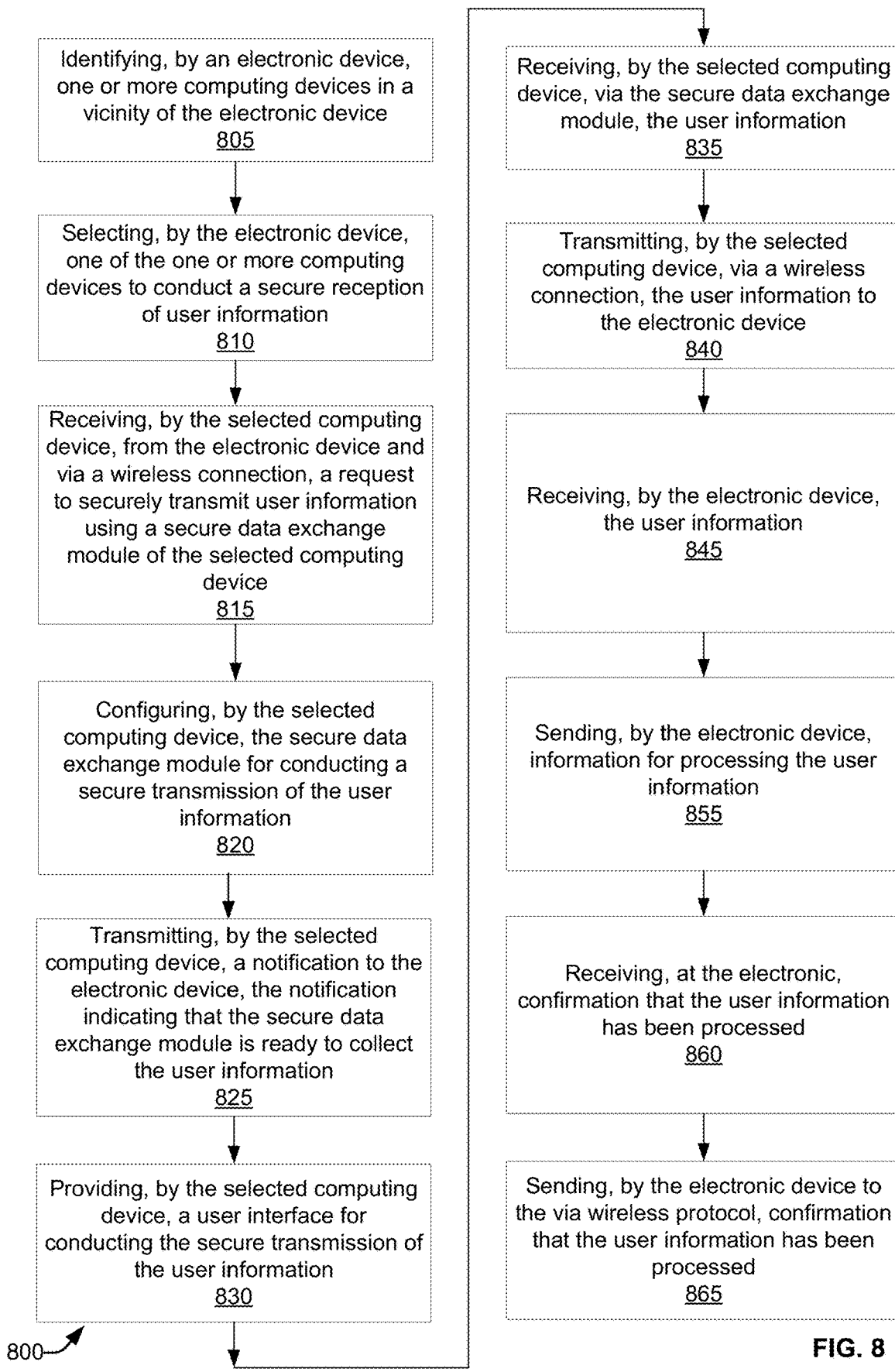
FIG. 8 is a flow diagram illustrating a method for conducting a secure data transfer using an electronic device and a computing device in FIG. 1 in accordance with an embodiment of the present disclosure.

FIG. 8 is a flow diagram illustrating a method for conducting a secure data transfer using an electronic device and a computing device in FIG. 1 in accordance with an embodiment of the present disclosure.

FIG. 8 is a flowchart of an example process 800 associated with techniques for secure data reception using a user device. In some implementations, one or more process blocks of FIG. 8 may be performed by a selected computing device (e.g., selected computing device 200 as shown in FIG. 2). In some implementations, one or more process blocks of FIG. 8 may be performed by another device or a group of devices separate from or including the computing device, such as computing device 104 or second computing device 106, card 108, and server 116 as shown in FIG. 1. Additionally, or alternatively, one or more process blocks of FIG. 6 may be performed by one or more components of computing device 200, such as processing subsystem 210, authentication subsystem 216, networking subsystem 214, display subsystem 240, memory subsystem 212, and secure subsystem 218, bus 238, and secure I/O subsystem 242.

At block 805, process 800 may include identifying one or more computing devices in a vicinity of the electronic device. For example, an electronic device may identify one or more computing devices in a vicinity of the electronic device, as described above. The electronic device may allow a user to select the computing device via a user interface. The electronic device may include a ranging device (e.g., UWB ranging) to conduct a ranging session with one or more computing devices in a vicinity of the electronic device. One or more ranging sessions can determine a distance between the electronic device and the one or more computing devices.

At block 810, process 800 may include selecting one of the one or more computing devices to conduct a secure reception of user information. For example, the electronic device may select one of the one or more computing devices to conduct a secure reception of user information, as described above. In various embodiments, the computing device can be selected by the electronic device based at least in part on the range. For example, the electronic device can select the computing device closest in range to the electronic device. In various embodiments, the electronic device can select a computing device that is paired with the electronic device (e.g., a wearable device).

At block 815, process 800 may include receiving from the electronic device and via a wireless connection, a request to securely transmit user information using a secure data exchange module of the selected computing device. For example, the computing device may receive, from an electronic device and via a wireless connection (e.g., Bluetooth, Wi-Fi), a request to securely transmit user information using a secure data exchange module of the computing device, as described above. The wireless connection can include NFC protocol. The user information can include payment information, identification information, key information, or ticket information.

At block 820, process 800 may include configuring the secure data exchange module for conducting a secure transmission of the user information. For example, the selected computing device may configure the secure data exchange module for conducting a secure transmission of the user information, as described above. The configuring of the secure data exchange module can include but is not limited to submitting attestation for approval and receiving a token, loading applet applications, configuring the module with vendor specific information.

At block 825, process 800 may include transmitting a notification to the electronic device, the notification indicating that the secure data exchange module is ready to collect the user information. For example, the selected computing device may transmit a notification to the electronic device, the notification indicating that the secure data exchange module is ready to collect the user information, as described above. The notification can include a message transmitted via a wireless protocol (e.g., Bluetooth, BLE, or Wi-Fi).

At block 830, process 800 may include providing a user interface for conducting the secure transmission of the user information. For example, the selected computing device may provide a user interface for conducting the secure transmission of the user information, as described above. The user interface can provide one or more user selectable icons to manage the secure transmission of the user information. The one or more user selectable icons may be displayed on a touch screen display. One of the user selectable icons may prompt the user to tap the computing device to transfer the user information (e.g., tap to pay). The user interface may display the status of the application or the status of authorizing payment information.

At block 835, process 800 may include receiving, via the secure data exchange module, the user information. For example, the selected computing device may receive, via the secure data exchange module, the user information, as described above. The secure data exchange module can be an NFC module that can receive the user information via a wireless protocol.

At block 840, process 800 may include transmitting, via a wireless connection, the user information to the electronic device. For example, the selected computing device may transmit, via a wireless connection, the user information to the electronic device, as described above. The wireless connection can be Bluetooth, BLE, Wi-Fi, Zigbee, or some other wireless protocol for the transfer of data.

At block 845, process 800 may include receiving the user information. For example, the electronic device may receive the user information, as described above. The user information can be sent via wireless connection (e.g., Bluetooth, BLE, Wi-Fi) from the computing device to the electronic device. The electronic device can receive the user information via the wireless connection.

At block 850, process 800 may include sending information for processing the user information. For example, the electronic device may send information for processing the user information, as described above. The user information can be sent via wireless connection (e.g., Bluetooth, BLE, Wi-Fi) from the electronic device to the server device. The server device can receive the user information via the wireless connection.

At block 855, process 800 may include receiving, at the electronic device, confirmation that the user information has been processed. For example, the electronic device may receive, at the electronic device, confirmation that the user information has been processed, as described above. The confirmation can be sent via wireless connection (e.g., Bluetooth, BLE, Wi-Fi) from the server device to the electronic device. The electronic device can receive the confirmation via the wireless connection. The user interface on the electronic device may indicate that the transaction is approved.

At block 860, process 800 may include sending, via wireless connection, confirmation that the user information has been processed. For example, the electronic device may send, via wireless connection, confirmation that the user information has been processed, as described above. The confirmation can be sent via wireless connection (e.g., Bluetooth, BLE, Wi-Fi) from the server device to the electronic device. The electronic device can receive the confirmation via the wireless connection. The user interface on the computing device may indicate that the transaction is approved.

Process 800 may include additional implementations, such as any single implementation or any combination of implementations described below and/or in connection with one or more other processes described elsewhere herein.

In a first implementation, the selecting of the one or more computing devices to conduct the secure reception of user information is done automatically.

In a second implementation, alone or in combination with the first implementation, the selection of the one or more computing devices to conduct the secure reception of user information is based at least in part on a range between the electronic device and the computing device.

In a third implementation, alone or in combination with one or more of the first and second implementations, process 800 includes receiving at least one of a biometric input or a code from a user, and authenticating the user based at least in part on the biometric input or the code prior to transmitting the information to the electronic device.

In a fourth implementation, alone or in combination with one or more of the first through third implementations, the electronic device and the selected computing device are paired.

In a fifth implementation, alone or in combination with one or more of the first through fourth implementations, the electronic device and the selected computing device utilize a same user account.

In a sixth implementation, alone or in combination with one or more of the first through fifth implementations, the secure reception of user information uses near field communication protocol.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9:
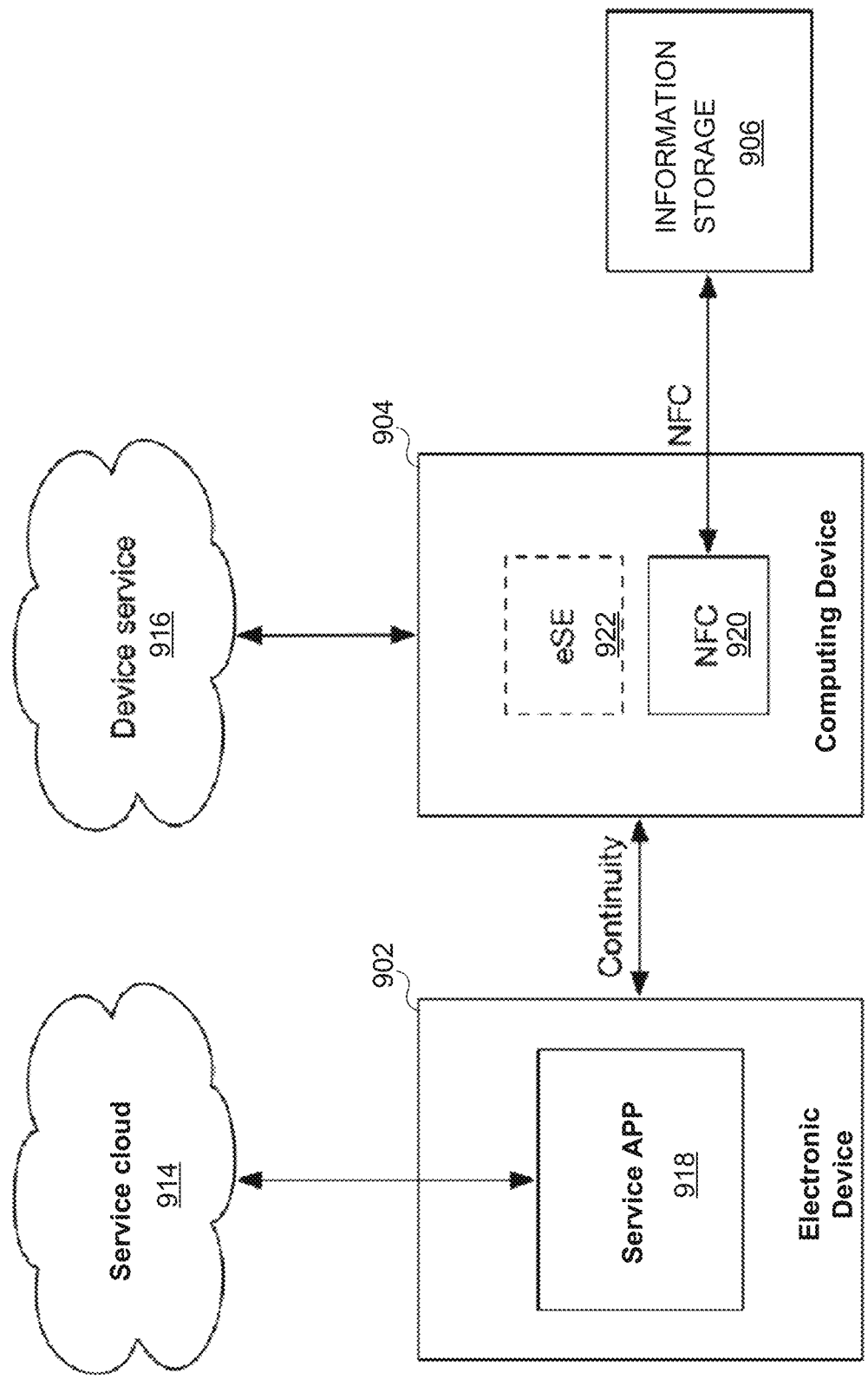
FIG. 9 illustrates a simplified block diagram for a system for conducting a secure data transfer.

FIG. 9 illustrates a simplified block diagram for a system for conducting a secure data transfer. FIG. 9 illustrated an electronic device 902 and a computing device 904. The electronic device 902 can be a tablet computer, a laptop computer, a desktop computer, a netbook or a smart display television. The electronic device 902 can execute a service application 918 (e.g., a point of sale application). The electronic device 902 can communicate with a data stored in a service cloud 914 (e.g., a payment service). The electronic device 902 can be configured to receive user information from a computing device 904.

The computing device 904 can include a secure data exchange module (e.g., NFC module). The secure data exchange module can include the processor, memory, antenna, transceiver, and antenna required to receive information via a wireless protocol. The secure data exchange module can receive information from an information storage location 906 (e.g., a card/wallet) of a user. The card/wallet can include an electronic chip for storing user information. The user information can be encrypted to protect the information. The encryption can utilize a secure element (e.g., eSE 922) that can be incorporated on the computing device 920. In various embodiments, the computing device 904 can access one or more device services 916 via a wireless connection.

Figure 10:
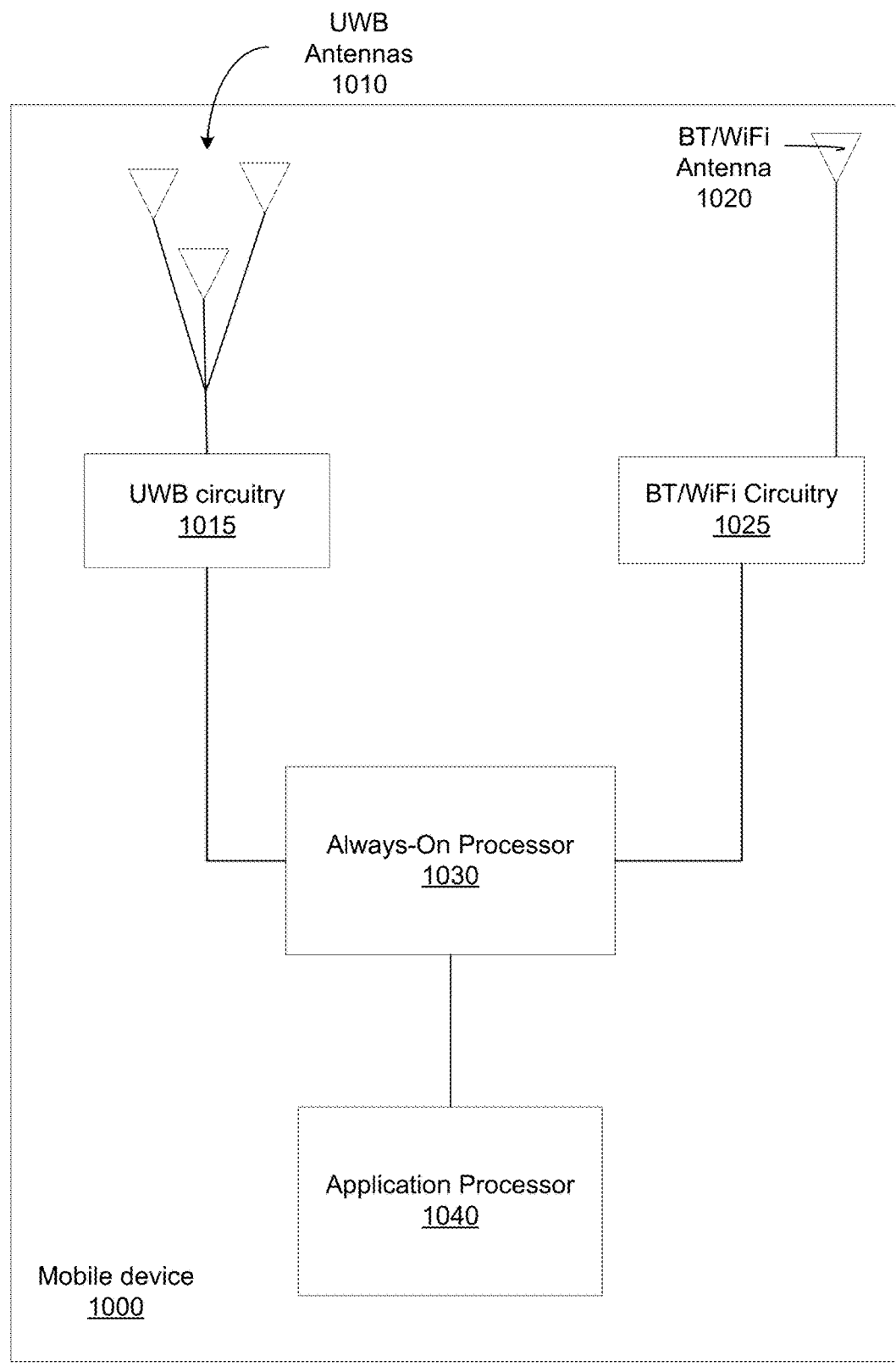
FIG. 10 is a block diagram of components of a mobile device operable to perform ranging according to embodiments of the present disclosure.

FIG. 10 is a block diagram of components of an electronic device 1000 operable to perform passive beacon communication techniques according to embodiments of the present disclosure. Electronic device 1000 includes antennas for at least two different wireless protocols, as described above. The first wireless protocol (e.g., Bluetooth) may be used for authentication and exchanging ranging settings. The second wireless protocol (e.g., ultra-wide band (UWB)) may be used for performing ranging with one or more computing devices.

As shown, electronic device 1000 includes UWB antennas 1010 for performing ranging. UWB antennas 1010 are connected to UWB circuitry 1015 for analyzing detected signals from UWB antennas 1010. In some embodiments, mobile device 1000 includes three or more UWB antennas, e.g., for performing triangulation. The different UWB antennas can have different orientations, e.g., two in one direction and a third in another direction. The orientations of the UWB antennas can define a field of view for ranging. As an example, the field of view can span 120 degrees. Such regulation can allow a determination of which direction a user is pointing a device relative to one or more other nearby devices. The field of view may include any one or more of pitch, yaw, or roll angles.

UWB circuitry 1015 can communicate with an always-on processor (AOP) 1030, which can perform further processing using information from UWB messages. For example, AOP 1030 can perform the ranging calculations using timing data provided by UWB circuitry 1015. AOP 1030 and other circuits of the device can include dedicated circuitry and/or configurable circuitry, e.g., via firmware or other software.

As shown, mobile device 1000 also includes Bluetooth (BT)/Wi-Fi antenna 1020 for communicating data with other devices. Bluetooth (BT)/Wi-Fi antenna 1020 is connected to BT/Wi-Fi circuitry 1025 for analyzing detected signals from BT/Wi-Fi antenna 1020. For example, BT/Wi-Fi circuitry 1025 can parse messages to obtain data (e.g., an authentication tag), which can be sent on to AOP 1030. In some embodiments, AOP 1030 can perform authentication using an authentication tag. Thus, AOP 1030 can store or retrieve a list of authentication tags for which to compare a received tag against, as part of an authentication process. In some implementations, such functionality could be achieved by BT/Wi-Fi circuitry 1025.

In other embodiments, UWB circuitry 1015 and BT/Wi-Fi circuitry 1025 can alternatively or in addition be connected to application processor 1040, which can perform similar functionality as AOP 1030. Application processor 1040 typically requires more power than AOP 1030, and thus power can be saved by AOP 1030 handling certain functionality, so that application processor 1040 can remain in a sleep state, e.g., an off state. As an example, application processor 1040 can be used for communicating audio or video using BT/Wi-Fi, while AOP 1030 can coordinate transmission of such content and communication between UWB circuitry 1015 and BT/Wi-Fi circuitry 1025. For instance, AOP 1030 can coordinate timing of UWB messages relative to BT advertisements.

Coordination by AOP 1030 can have various benefits. For example, a first user of a sending device may want to share content with another user, and thus ranging may be desired with a receiving device of this other user. However, if many people are in the same room, the sending device may need to distinguish a particular device among the multiple devices in the room, and potentially determine which device the sending device is pointing to. Such functionality can be provided by AOP 1030. In addition, it is not desirable to wake up the application processor of every other device in the room, and thus the AOPs of the other devices can perform some processing of the messages and determine that the destination address is for a different device.

To perform ranging, BT/Wi-Fi circuitry 1025 can analyze an advertisement signal from another device to determine that the other device wants to perform ranging, e.g., as part of a process for sharing content. BT/Wi-Fi circuitry 1025 can communicate this notification to AOP 1030, which can schedule UWB circuitry 1015 to be ready to detect UWB messages from the other device.

For the device initiating ranging, its AOP can perform the ranging calculations. Further, the AOP can monitor changes in distance between the other devices. For example, AOP 1030 can compare the distance to a threshold value and provide an alert when the distance exceeds a threshold, or potentially provide a reminder when the two devices become sufficiently close. An example of the former might be when a parent wants to be alerted when a child (and presumably the child's device) is too far away. An example of the latter might be when a person wants to be reminded to bring up something when talking to a user of the other device. Such monitoring by the AOP can reduce power consumption by the application processor.

Figure 11:
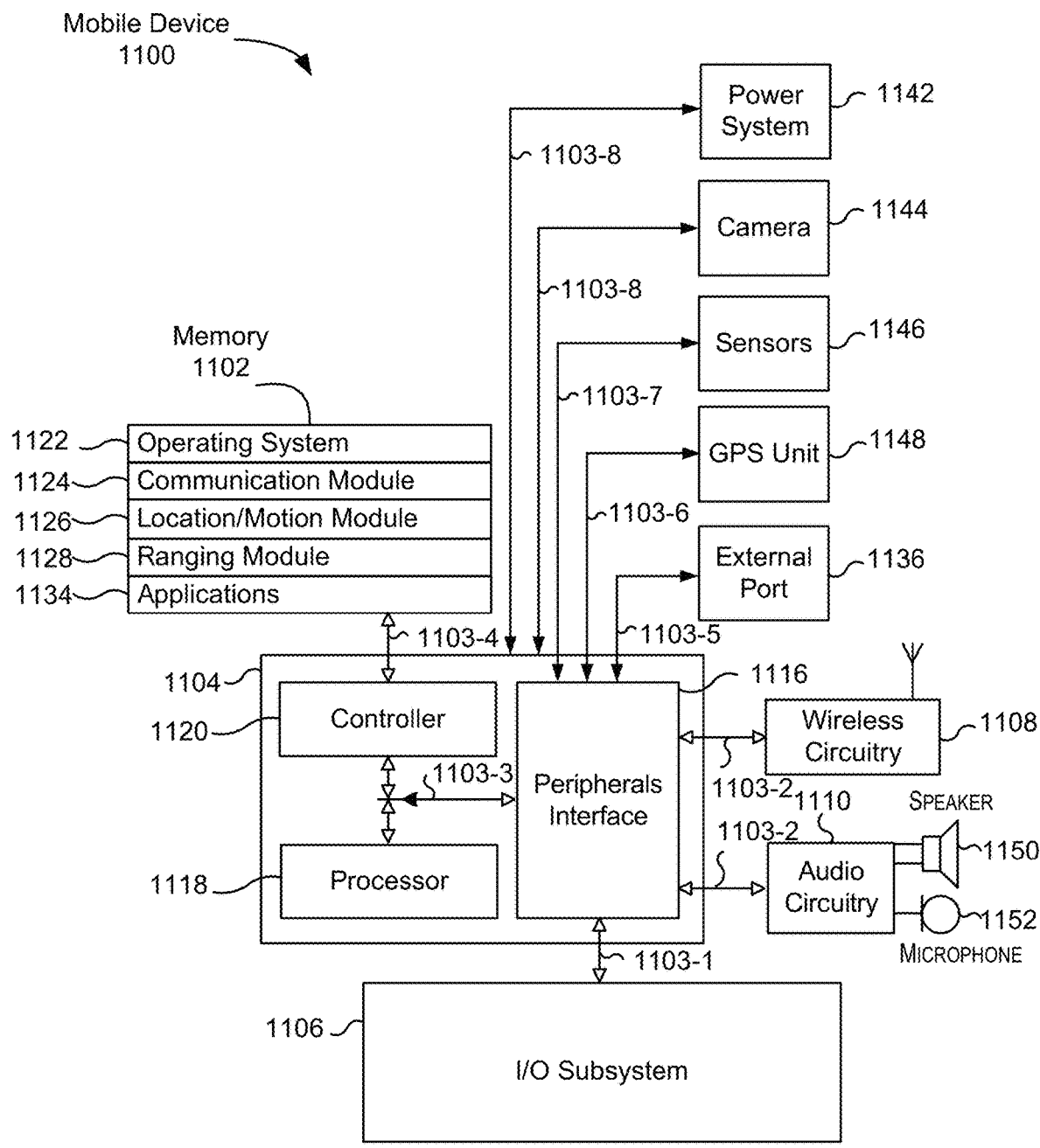
FIG. 11 is a block diagram of an example device according to embodiments of the present disclosure.

FIG. 11 is a block diagram of an example electronic 1100. The electronic device 1100 can include a smartphone, a wearable device (e.g., a smartwatch, smart glasses), a tablet computer, a laptop computer, or a desktop computer. The electronic device 1100 generally includes computer-readable medium 1102, control circuitry 1104, an Input/Output (I/O) subsystem 1106, wireless circuitry 1108, and audio circuitry 1110 including speaker 1150 and microphone 1152. These components may be coupled by one or more communication buses or signal lines 1103. Electronic device 1100 can be any portable electronic device, including a handheld computer, a tablet computer, a mobile phone, a laptop computer, a tablet device, a media player, a personal digital assistant (PDA), a key fob, a car key, an access card, a multifunction device, a mobile phone, a portable gaming device, a headset, or the like, including a combination of two or more of these items.

It should be apparent that the architecture shown in FIG. 11 is only one example of an architecture for electronic device 1100, and that electronic device 1100 can have more or fewer components than shown, or a different configuration of components. The various components shown in FIG. 11 can be implemented in hardware, software, or a combination of both hardware and software, including one or more signal processing and/or application-specific integrated circuits.

Wireless circuitry 1108 is used to send and receive information over a wireless link or network to one or more other devices' conventional circuitry such as an antenna system, a radio frequency (RF) transceiver, one or more amplifiers, a tuner, one or more oscillators, a digital signal processor, a CODEC chipset, memory, etc. Wireless circuitry 1108 can use various protocols, e.g., as described herein. In various embodiments, wireless circuitry 1108 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), Long-term Evolution (LTE)-Advanced, Wi-Fi (such as Institute of Electrical and Electronics Engineers (IEEE) 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document.

Wireless circuitry 1108 is coupled to control circuitry 1104 via peripherals interface 1116. Peripherals interface 1116 can include conventional components for establishing and maintaining communication between peripherals. Voice and data information received by wireless circuitry 1108 (e.g., in speech recognition or voice command applications) is sent to one or more processors 1118 via peripherals interface 1116. One or more processors 1118 are configurable to process various data formats for one or more application programs 1134 stored on computer-readable medium 1102.

Peripherals interface 1116 couple the input and output peripherals of electronic device 1100 to the one or more processors 1118 and computer-readable medium 1102. One or more processors 1118 communicate with computer-readable medium 1102 via a controller 1120. Computer-readable medium 1102 can be any device or medium that can store code and/or data for use by one or more processors 1118. Computer-readable medium 1102 can include a memory hierarchy, including cache, main memory, and secondary memory. The memory hierarchy can be implemented using any combination of RAM (e.g., Standard Random Access Memory (SRAM), Dynamic Random Access Memory (DRAM), Double Data Random Access Memory (DDRAM), Read-Only Memory (ROM), FLASH, magnetic and/or optical storage devices, such as disk drives, magnetic tape, CDs (compact disks) and DVDs (digital video discs)). In some embodiments, peripherals interface 1116, one or more processors 1118, and controller 1120 can be implemented on a single chip, such as control circuitry 1104. In some other embodiments, they can be implemented on separate chips.

Processors 1118 can include hardware and/or software elements that perform one or more processing functions, such as mathematical operations, logical operations, data manipulation operations, data transfer operations, controlling the reception of user input, controlling output of information to users, or the like. Processors 1118 can be embodied as one or more hardware processors, microprocessors, microcontrollers; field programmable gate arrays (FPGAs), application-specified integrated circuits (ASICs), or the like.

Electronic device 1100 may include storage and processing circuitry such as control circuitry 1104. Control circuitry 1104 may include storage such as hard disk drive storage, nonvolatile memory (e.g., flash memory or other electrically-programmable-read-only memory configured to form a solid-state drive), volatile memory (e.g., static or dynamic random-access-memory), etc. Processing circuitry in control circuitry 1104 may be used to control the operation of electronic device 1100. This processing circuitry may be based on one or more microprocessors, microcontrollers, digital signal processors, baseband processor integrated circuits, application specific integrated circuits, etc.

Control circuitry 1104 may be used to run software on electronic device 1100, such as internet browsing applications, voice-over-internet-protocol (VOIP) telephone call applications, email applications, media playback applications, operating system functions, etc. To support interactions with external equipment, control circuitry 1104 may be used in implementing communications protocols. Communications protocols that may be implemented using control circuitry 1104 include internet protocols, wireless local area network protocols (e.g., IEEE 802.11 protocols—sometimes referred to as Wi-Fi®), protocols for other short-range wireless communications links such as the Bluetooth® protocol, cellular telephone protocols, multiple-input and multiple-output (MIMO) protocols, antenna diversity protocols, satellite navigation system protocols, millimeter wave communications protocols, IEEE 802.15.4 ultra-wideband communications protocols, etc.

Electronic device 1100 may include I/O subsystems 1106. I/O subsystems 1106 may include input-output devices. Input-output devices may be used to allow data to be supplied to electronic device 1100 and to allow data to be provided from electronic device 1100 to external devices. Input-output devices may include user interface devices, data port devices, and other input-output components. For example, input-output devices may include one or more displays (e.g., touch screens or displays without touch sensor capabilities), one or more image sensors 1144 (e.g., digital image sensors), motion sensors, and speakers 1150. Input-output devices may also include buttons, joysticks, scrolling wheels, touch pads, key pads, keyboards, microphones 1152, haptic elements such as vibrators and actuators, status indicators, light sources, audio jacks and other audio port components, digital data port devices, light sensors, capacitance sensors, proximity sensors (e.g., a capacitive proximity sensor and/or an infrared proximity sensor), magnetic sensors, and other sensors and input-output components.

Electronic device 1100 also includes a power system 1142 for powering the various hardware components. Power system 1142 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, electronic device 1100 includes an image sensor 1144 (e.g., a camera). In some embodiments, electronic device 1100 includes sensors 1146. Sensors can include accelerometers, compasses, gyrometers, pressure sensors, audio sensors, light sensors, barometers, and the like. Sensors 1146 can be used to sense location aspects, such as auditory or light signatures of a location.

In some embodiments, electronic device 1100 can include a GPS receiver, sometimes referred to as a GPS unit 1148. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1118 run various software components stored in computer-readable medium 1102 to perform various functions for electronic device 1100. In some embodiments, the software components include an operating system 1122, a communication module 1124 (or set of instructions), a location/motion module 1126 (or set of instructions), a ranging module 1128 that is used as part of ranging operation described herein, and other application programs 1134 (or set of instructions).

Operating system 1122 can be any suitable operating system, including iOS, Mac OS, Darwin, Quatros Real-Time Operating System (RTXC), LINUX, UNIX, OS X, WINDOWS, or an embedded operating system such as VxWorks. The operating system can include various procedures, sets of instructions, software components, and/or drivers for controlling and managing general system tasks (e.g., memory management, storage device control, power management, etc.) and facilitates communication between various hardware and software components.

Communication module 1124 facilitates communication with other devices over one or more external ports 1136 or via wireless circuitry 1108 and includes various software components for handling data received from wireless circuitry 1108 and/or external port 1136. External port 1136 (e.g., universal serial bus (USB), FireWire, Lightning connector, 60-pin connector, etc.) is adapted for coupling directly to other devices or indirectly over a network (e.g., the Internet, wireless local area network (LAN), etc.).

Location/motion module 1126 can assist in determining the current position (e.g., coordinates or other geographic location identifiers) and motion of electronic device 1100. Modern positioning systems include satellite based positioning systems, such as Global Positioning System (GPS), cellular network positioning based on "cell IDs," and Wi-Fi positioning technology based on Wi-Fi networks. GPS also relies on the visibility of multiple satellites to determine a position estimate, which may not be visible (or have weak signals) indoors or in "urban canyons." In some embodiments, location/motion module 1126 receives data from GPS unit 1148 and analyzes the signals to determine the current position of the mobile device. In some embodiments, location/motion module 1126 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 1108 and is passed to location/motion module 1126. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for electronic device 1100 based on the position coordinates of the corresponding transmitters. Regardless of the specific location technology used, location/motion module 1126 receives information from which a location fix can be derived, interprets that information, and returns location information, such as geographic coordinates, latitude/longitude, or other location fix data, Ranging module 1128 can send/receive ranging messages to/from an antenna, e.g., connected to wireless circuitry 1108. The messages can be used for various purposes, e.g., to identify a sending antenna of a device, determine timestamps of messages to determine a distance of electronic device 1100 from another device. Ranging module 1128 can exist on various processors of the device, e.g., an always-on processor (AOP), a UWB chip, and/or an application processor. For example, parts of ranging module 1128 can determine a distance on an AOP, and another part of the ranging module can interact with a sharing module, e.g., to display a position of the other device on a screen in order for a user to select the other device to share a data item. Ranging module 1128 can also interact with a reminder module that can provide an alert based on a distance from another mobile device.

Dielectric-filled openings such as plastic-filled openings may be formed in metal portions of housing such as in metal sidewall structures (e.g., to serve as antenna windows and/or to serve as gaps that separate portions of antennas from each other).

Antennas may be mounted in housing. If desired, some of the antennas (e.g., antenna arrays that may implement beam steering, etc.) may be mounted under dielectric portions of electronic device 1100 (e.g., portions of the display cover layer, portions of a plastic antenna window in a metal housing sidewall portion of housing, etc.). With one illustrative configuration, some or all of the rear face of electronic device 1100 may be formed from a dielectric. For example, the rear wall of housing may be formed from glass plastic, ceramic, other dielectric. In this type of arrangement, antennas may be mounted within the interior of electronic device 1100 in a location that allows the antennas to transmit and receive antenna signals through the rear wall of electronic device 1100 (and, if desired, through optional dielectric sidewall portions in housing). Antennas may also be formed from metal sidewall structures in housing and may be located in peripheral portions of electronic device 1100.

To avoid disrupting communications when an external object such as a human hand or other body part of a user blocks one or more antennas, antennas may be mounted at multiple locations in housing. Sensor data such as proximity sensor data, real-time antenna impedance measurements, signal quality measurements such as received signal strength information, and other data may be used in determining when one or more antennas are being adversely affected due to the orientation of housing, blockage by a user's hand or other external object, or other environmental factors. Electronic device 1100 can then switch one or more replacement antennas into use in place of the antennas that are being adversely affected.

Antennas may be mounted at the corners of housing, along the peripheral edges of housing, on the rear of housing, under the display cover layer that is used in covering and protecting display on the front of electronic device 1100 (e.g., a glass cover layer, a sapphire cover layer, a plastic cover layer, other dielectric cover layer structures, etc.), under a dielectric window on a rear face of housing or the edge of housing, under a dielectric rear wall of housing, or elsewhere in electronic device 1100. As an example, antennas may be mounted at one or both ends of electronic device 1100 (e.g., along the upper and lower edges of housing, at the corners of housing, etc.).

Antennas in electronic device 1100 may include cellular telephone antennas, wireless local area network antennas (e.g., Wi-Fi® antennas at 2.4 GHz and 5 GHz and other suitable wireless local area network antennas), satellite navigation system signals, and near-field communications antennas. The antennas may also include antennas that support IEEE 802.15.4 ultra-wideband communications protocols and/or antennas for handling millimeter wave communications. For example, the antennas may include two or more ultra-wideband frequency antennas and/or millimeter wave phased antenna arrays. Millimeter wave communications, which are sometimes referred to as extremely high frequency (EHF) communications, involve signals at 60 GHz or other frequencies between about 10 GHz and 400 GHz.

Wireless circuitry in electronic device 1100 may support communications using the IEEE 802.15.4 ultra-wideband protocol. In an IEEE 802.15.4 system, a pair of devices may exchange wireless time stamped messages. Time stamps in the messages may be analyzed to determine the time of flight of the messages and thereby determine the distance (range) between the devices.

Image sensors 1144 may include one or more visible digital image sensors (visible-light cameras) and/or one or more infrared digital image sensors (infrared-light cameras). Image sensors 1144 may, if desired, be used to measure distances. For example, an infrared time-of-flight image sensor may be used to measure the time that it takes for an infrared light pulse to reflect back from objects in the vicinity of electronic device 1100, which may in turn be used to determine the distance to those objects. Visible imaging systems such as a front and/or rear-facing camera in electronic device 1100 may also be used to determine the position of objects in the environment. For example, control circuitry 1104 may use image sensors 1144 to perform simultaneous localization and mapping (SLAM). SLAM refers to the process of using images to determine the position of objects in the environment while also constructing a representation of the imaged environment. Visual SLAM techniques include detecting and tracking certain features in images such as edges, textures, room corners, window corners, door corners, faces, sidewalk edges, street edges, building edges, tree trunks, and other prominent features. Control circuitry 1104 may rely entirely upon image sensors 1144 to perform simultaneous localization and mapping, or control circuitry 1104 may synthesize image data with range data from one or more distance sensors (e.g., light-based proximity sensors). If desired, control circuitry 1104 may use a display to display a visual representation of the mapped environment.

Input-output devices may include motion sensors 1146. Motion sensors 1146 may include one or more accelerometers (e.g., accelerometers that measure acceleration along one, two, or three axes), gyroscopes, barometers, magnetic sensors (e.g., compasses), image sensors (e.g., image sensor 1144) and other sensor structures. Sensors 1146 may, for example, include one or more microelectromechanical systems (MEMS) sensors (e.g., accelerometers, gyroscopes, microphones, force sensors, pressure sensors, capacitive sensors, or any other suitable type of sensor formed using microelectromechanical systems technology).

Control circuitry 1104 may be used to store and process motion sensor data. If desired, motion sensors, processing circuitry, and storage that form motion sensor circuitry may form part of a system-on-chip integrated circuit (as an example).

Input-output devices may include movement generation circuitry. Movement generation circuitry may receive control signals from control circuitry 1104. Movement generation circuitry may include electromechanical actuator circuitry that, when driven, moves electronic device 1100 in one or more directions. For example, movement generation circuitry may laterally move electronic device 1100 and/or may rotate electronic device 1100 around one or more axes of rotation. Movement generation circuitry may, for example, include one or more actuators formed at one or more locations of electronic device 1100. When driven by a motion control signal, actuators may move (e.g., vibrate, pulse, tilt, push, pull, rotate, etc.) to cause electronic device 1100 to move or rotate in one or more directions. The movement may be slight (e.g., not noticeable or barely noticeable to a user of electronic device 1100), or the movement may be substantial. Actuators may be based on one or more vibrators, motors, solenoids, piezoelectric actuators, speaker coils, or any other desired device capable of mechanically (physically) moving electronic device 1100.

Some or all of movement generation circuitry such as actuators may be used to perform operations that are unrelated to rotation of electronic device 1100. For example, actuators may include vibrators that are actuated to issue a haptic alert or notification to a user of electronic device 1100. Such alerts may include, for example, a received text message alert identifying that electronic device 1100 has received a text message, a received telephone call alert, a received email alert, an alarm notification alert, a calendar notification alert, or any other desired notification. By actuating actuator, electronic device 1100 may inform the user of any desired device condition.

Motion sensor circuitry may sense motion of electronic device 1100 that is generated by movement generation circuitry. If desired, motion sensor circuitry may provide feedback signals associated with the sensed motion of electronic device 1100 to movement generation circuitry. Movement generation circuitry may use the feedback signals to control actuation of the movement generation circuitry.

Control circuitry 1104 may use motion sensor circuitry and/or movement generation circuitry to determine the angle of arrival of wireless signals received by electronic device 1100 from another electronic device. For example, control circuitry 1104 may use movement generation circuitry to move electronic device 1100 from one position to another. Motion sensor circuitry may be used to track the movement of electronic device 1100 as it is moved between the different positions. At each position, control circuitry 1104 may receive wireless signals from another electronic device. Control circuitry 1104 may process the received wireless signals together with the motion data from motion sensor circuitry to more accurately determine the position of the other electronic device. The use of motion generation circuitry is merely illustrative, however. If desired, motion sensor circuitry may track movement of electronic device 1100 that is not caused by motion generation circuitry. This may include a user's natural, unprompted movement of electronic device 1100 and/or the user's movement of electronic device 1100 after the user is prompted (by display, audio circuitry 1110, a haptic output device in electronic device 1100, or any other suitable output device) to move electronic device 1100 in a particular fashion.

Other sensors that may be included in input-output devices include ambient light sensors for gathering information on ambient light levels, proximity sensor components (e.g., light-based proximity sensors, capacitive proximity sensors, and/or proximity sensors based on other structures), depth sensors (e.g., structured light depth sensors that emit beams of light in a grid, a random dot array, or other pattern, and that have image sensors that generate depth maps based on the resulting spots of light produced on target objects), sensors that gather three-dimensional depth information using a pair of stereoscopic image sensors, LIDAR (light detection and ranging) sensors, radar sensors, and other suitable sensors.

Input-output circuitry may include wireless communications circuitry for communicating wirelessly with external equipment. Wireless communications circuitry may include radio frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless circuitry 1108 may include radio-frequency transceiver circuitry for handling various radio-frequency communications bands. For example, wireless circuitry 1108 may include transceiver circuitry.

Transceiver circuitry may be wireless local area network transceiver circuitry. Transceiver circuitry may handle 2.4 GHz and 5 GHz bands for Wi-Fi® (IEEE 802.11) communications and may handle the 2.4 GHz Bluetooth® communications band.

Circuitry may use cellular telephone transceiver circuitry for handling wireless communications in frequency ranges such as a communications band from 700 to 960 Mega Hertz (MHz), a band from 1710 to 2170 MHz, a band from 2300 to 2700 MHz, other bands between 700 and 2700 MHz, higher bands such as LTE bands 42 and 43 (3.4-3.6 GHz), or other cellular telephone communications bands. Circuitry may handle voice data and non-voice data.

Millimeter wave transceiver circuitry (sometimes referred to as extremely high frequency transceiver circuitry) may support communications at extremely high frequencies (e.g., millimeter wave frequencies such as extremely high frequencies of 10 GHz to 400 GHz or other millimeter wave frequencies). For example, circuitry may support IEEE 802.11ad communications at 60 GHz. Circuitry may be formed from one or more integrated circuits (e.g., multiple integrated circuits mounted on a common printed circuit in a system-in-package device, one or more integrated circuits mounted on different substrates, etc.).

Ultra-wideband transceiver circuitry may support communications using the IEEE 802.15.4 protocol and/or other wireless communications protocols. Ultra-wideband wireless signals may be characterized by bandwidths greater than 500 MHz or bandwidths exceeding 20% of the center frequency of radiation. The presence of lower frequencies in the baseband may allow ultra-wideband signals to penetrate through objects such as walls. Transceiver circuitry may operate in a 2.4 GHz frequency band, a 6.5 GHz frequency band, an 8 GHz frequency band, and/or at other suitable frequencies.

Wireless communications circuitry may include satellite navigation system circuitry such as Global Positioning System (GPS) receiver circuitry for receiving GPS signals at 1575 MHz or for handling other satellite positioning data (e.g., GLONASS signals at 1609 MHz). Satellite navigation system signals for a receiver are received from a constellation of satellites orbiting the earth.

In satellite navigation system links, cellular telephone links, and other long-range links, wireless signals are typically used to convey data over thousands of feet or miles. In Wi-Fi® and Bluetooth® links at 2.4 and 5 GHz and other short-range wireless links, wireless signals are typically used to convey data over tens or hundreds of feet. Extremely high frequency (EHF) wireless transceiver circuitry may convey signals over these short distances that travel between transmitter and receiver over a line-of-sight path. To enhance signal reception for millimeter wave communications, phased antenna arrays and beam steering techniques may be used (e.g., schemes in which antenna signal phase and/or magnitude for each antenna in an array is adjusted to perform beam steering). Antenna diversity schemes may also be used to ensure that the antennas that have become blocked or that are otherwise degraded due to the operating environment of electronic device 1100 can be switched out of use and higher-performing antennas used in their place.

Wireless communications circuitry can include circuitry for other short-range and long-range wireless links if desired. For example, wireless communications circuitry 36 may include circuitry for receiving television and radio signals, paging system transceivers, near field communications (NFC) circuitry, etc.

The one or more applications 1134 on electronic device 1100 can include any applications installed on the electronic device 1100, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or advanced audio codec (AAC) files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations, and the like) on a display surface. In another example, a timer module can be a software timer. The timer module can also be implemented in hardware. The time module can maintain various timers for any number of events.

I/O subsystem 1106 can be coupled to a display system (not shown), which can be a touch-sensitive display. The display displays visual output to the user in a graphics user interface (GUI). The visual output can include text, graphics, video, and any combination thereof. Some or all of the visual output can correspond to user-interface objects. A display can use LED (light emitting diode) technology, LCD (liquid crystal display) technology, or LPD (light emitting polymer display) technology, although other display technologies can be used in other embodiments.

In some embodiments, I/O subsystem 1106 can include a display and user input devices such as a keyboard, mouse, and/or trackpad. In some embodiments, I/O subsystem 1106 can include a touch-sensitive display. A touch-sensitive display can also accept input from the user based at least partly on haptic and/or tactile contact. In some embodiments, a touch-sensitive display forms a touch-sensitive surface that accepts user input. The touch-sensitive display/surface (along with any associated modules and/or sets of instructions in computer-readable medium 1102) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 1106 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, electronic device 1100 can include a touchpad (not shown) for activating or deactivating particular functions. In some embodiments, the touchpad is a touch-sensitive area of the electronic device 1100 that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read-only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g., a solid state drive, a hard drive, a CD, or an entire computer system), and may be present on or within different computer products within a system or network. A computer system may include a monitor, printer, or other suitable display for providing any of the results mentioned herein to a user.

I. Example Electronic Device

FIG. 12 is a block diagram of an example electronic device 1200. Device 1200 generally includes a processor 1202, a computer-readable medium 1204, a power system 1206, a ranging module 1208, a communication module (e.g., Bluetooth), and I/O subsystem 1212. These components may be coupled by one or more communication buses or signal lines 1214. Device 1200 can be any electronic device, including a handheld computer, a tablet computer, a mobile phone, a laptop computer, a tablet device, a media player, personal digital assistant (PDA), a key fob, a car key, an electronic tag, an access card, a multifunction device, a mobile phone, a portable gaming device, a headset, or the like, including a combination of two or more of these items.

It should be apparent that the architecture shown in FIG. 12 is only one example of an architecture for device 1200, and that device 1200 can have more or fewer components than shown, or a different configuration of components. The various components shown in FIG. 12 can be implemented in hardware, software, or a combination of both hardware and software, including one or more signal processing and/or application specific integrated circuits. Although the electronic device 1200 is depicted as being round in shape it is not so limited.

A communication module 1210 can include wireless circuitry that can be used to send and receive information over a wireless link or network to one or more other devices' conventional circuitry such as an antenna system, a radio frequency (RF) transceiver, one or more amplifiers, a tuner, one or more oscillators, a digital signal processor, a CODEC chipset, memory, etc. Wireless circuitry can use various protocols, e.g., as described herein. In various embodiments, wireless circuitry is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), Long-term Evolution (LTE)-Advanced, Wi-Fi (such as Institute of Electrical and Electronics Engineers (IEEE) 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document.

One or more processors 1202 communicate with computer-readable medium 1204. Computer-readable medium 1204 can be any device or medium that can store code and/or data for use by one or more processors 1202. Computer-readable medium 1204 can include a memory hierarchy, including cache, main memory, and secondary memory. The memory hierarchy can be implemented using any combination of RAM (e.g., Standard Random Access Memory (SRAM), Dynamic Random Access Memory (DRAM), Double Data Random Access Memory (DDRAM), Read only Memory (ROM), FLASH, magnetic and/or optical storage devices, such as disk drives, magnetic tape, CDs (compact disks) and DVDs (digital video discs)).

Processor(s) 1202 can include hardware and/or software elements that perform one or more processing functions, such as mathematical operations, logical operations, data manipulation operations, data transfer operations, controlling the reception of user input, controlling output of information to users, or the like. Processor(s) 1202 can be embodied as one or more hardware processors, microprocessors, microcontrollers; field programmable gate arrays (FPGAs), application-specified integrated circuits (ASICs), or the like.

Device 1200 may include storage and processing circuitry such as control circuitry 1216. Control circuitry 1216 may include storage such as hard disk drive storage, nonvolatile memory (e.g., flash memory or other electrically-programmable-read-only memory configured to form a solid-state drive), volatile memory (e.g., static or dynamic random-access-memory), etc. Processing circuitry in control circuitry 1216 may be used to control the operation of device 1200. This processing circuitry may be based on one or more microprocessors, microcontrollers, digital signal processors, baseband processor integrated circuits, application specific integrated circuits, etc.

Control circuitry 1216 may be used to run software on device 1200, such as internet browsing applications, voice-over-internet-protocol (VOIP) telephone call applications, email applications, media playback applications, operating system functions, etc. To support interactions with external equipment, control circuitry 1216 may be used in implementing communications protocols. Communications protocols that may be implemented using control circuitry 1216 include internet protocols, wireless local area network protocols (e.g., IEEE 802.11 protocols—sometimes referred to as Wi-Fi®), protocols for other short-range wireless communications links such as the Bluetooth® protocol, cellular telephone protocols, multiple-input and multiple-output (MIMO) protocols, antenna diversity protocols, satellite navigation system protocols, millimeter wave communications protocols, IEEE 802.15.4 ultra-wideband communications protocols, etc.

Device 1200 may include I/O subsystem 1212. I/O subsystem 1212 may include input-output devices. Input-output devices may be used to allow data to be supplied to device 1200 and to allow data to be provided from device 1200 to external devices. Input-output devices may include user interface devices, data port devices, and other input-output components. For example, input-output devices may include one or more displays (e.g., touch screens or displays without touch sensor capabilities), one or more image sensors (e.g., digital image sensors), motion sensors, and speakers. Input-output devices may also include buttons, joysticks, scrolling wheels, touch pads, key pads, keyboards, microphones, haptic elements such as vibrators and actuators, status indicators, light sources, audio jacks and other audio port components, digital data port devices, light sensors, capacitance sensors, proximity sensors (e.g., a capacitive proximity sensor and/or an infrared proximity sensor), magnetic sensors, and other sensors and input-output components.

Device 1200 also includes a power system 1206 for powering the various hardware components. Power system 1206 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 1200 includes an image sensor (e.g., a camera). In some embodiments, device 1200 includes sensors. Sensors can include accelerometers, compass, gyrometer, pressure sensors, audio sensors, light sensors, barometers, and the like. Sensors can be used to sense location aspects, such as auditory or light signatures of a location.

In some embodiments, device 1200 can include a GPS receiver, sometimes referred to as a GPS unit. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1202 run various software components stored in computer-readable medium 1204 to perform various functions for device 1200. In some embodiments, the software components include an operating system, a communication module 1210 (or set of instructions), a location module (or set of instructions), a ranging module 1208 that is used as part of ranging operation described herein, and other application programs (or set of instructions).

The operating system can be any suitable operating system, including iOS, Mac OS, Darwin, Quatros Real-Time Operating System (RTXC), LINUX, UNIX, OS X, WINDOWS, or an embedded operating system such as VxWorks. The operating system can include various procedures, sets of instructions, software components, and/or drivers for controlling and managing general system tasks (e.g., memory management, storage device control, power management, etc.) and facilitates communication between various hardware and software components.

Communication module 1210 facilitates communication with other devices over one or more external ports or via wireless circuitry and includes various software components for handling data received from wireless circuitry and/or external port. The external port (e.g., universal serial bus (USB), FireWire, Lightning connector, 60-pin connector, etc.) is adapted for coupling directly to other devices or indirectly over a network (e.g., the Internet, wireless LAN, etc.).

Location/motion module can assist in determining the current position (e.g., coordinates or other geographic location identifiers) and motion of device 1200. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module receives data from GPS unit 1248 and analyzes the signals to determine the current position of the mobile device. In some embodiments, location/motion module can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry and is passed to location/motion module. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 1200 based on the position coordinates of the corresponding transmitters. Regardless of the specific location technology used, location/motion module receives information from which a location fix can be derived, interprets that information, and returns location information, such as geographic coordinates, latitude/longitude, or other location fix data Ranging module 1208 can send/receive ranging messages to/from an antenna, e.g., connected to wireless circuitry. The messages can be used for various purposes, e.g., to identify a sending antenna of a device, determine timestamps of messages to determine a distance of mobile device 1200 from another device. Ranging module 1208 can exist on various processors of the device, e.g., an always-on processor (AOP), a UWB chip, and/or an application processor. For example, parts of ranging module 1208 can determine a distance on an AOP, and another part of the ranging module can interact with a sharing module, e.g., to display a position of the other device on a screen in order for a user to select the other device to share a data item. Ranging module 1208 can also interact with a reminder module that can provide an alert based on a distance from another mobile device.

Dielectric-filled openings such as plastic-filled openings may be formed in metal portions of housing such as in metal sidewall structures (e.g., to serve as antenna windows and/or to serve as gaps that separate portions of antennas from each other).

Antennas may be mounted in housing. If desired, some of the antennas (e.g., antenna arrays that may implement beam steering, etc.) may be mounted under dielectric portions of device 1200 (e.g., portions of the display cover layer, portions of a plastic antenna window in a metal housing sidewall portion of housing, etc.). With one illustrative configuration, some or all of the rear face of device 1200 may be formed from a dielectric. For example, the rear wall of housing may be formed from glass plastic, ceramic, other dielectric. In this type of arrangement, antennas may be mounted within the interior of device 1200 in a location that allows the antennas to transmit and receive antenna signals through the rear wall of device 1200 (and, if desired, through optional dielectric sidewall portions in housing). Antennas may also be formed from metal sidewall structures in housing and may be located in peripheral portions of device 1200.

To avoid disrupting communications when an external object such as a human hand or other body part of a user blocks one or more antennas, antennas may be mounted at multiple locations in housing. Sensor data such as proximity sensor data, real-time antenna impedance measurements, signal quality measurements such as received signal strength information, and other data may be used in determining when one or more antennas are being adversely affected due to the orientation of housing, blockage by a user's hand or other external object, or other environmental factors. Device 1200 can then switch one or more replacement antennas into use in place of the antennas that are being adversely affected.

Antennas may be mounted at the corners of housing, along the peripheral edges of housing, on the rear of housing, under the display cover layer that is used in covering and protecting the display on the front of device 1200 (e.g., a glass cover layer, a sapphire cover layer, a plastic cover layer, other dielectric cover layer structures, etc.), under a dielectric window on a rear face of housing or the edge of housing, under a dielectric rear wall of housing, or elsewhere in device 1200. As an example, antennas may be mounted at one or both ends of device 1200 (e.g., along the upper and lower edges of housing, at the corners of housing, etc.).

Antennas in device 1200 may include cellular telephone antennas, wireless local area network antennas (e.g., Wi-Fi® antennas at 2.4 GHz and 5 GHz and other suitable wireless local area network antennas), satellite navigation system signals, and near-field communications antennas. The antennas may also include antennas that support IEEE 802.15.4 ultra-wideband communications protocols and/or antennas for handling millimeter wave communications. For example, the antennas may include two or more ultra-wideband frequency antennas and/or millimeter wave phased antenna arrays. Millimeter wave communications, which are sometimes referred to as extremely high frequency (EHF) communications, involve signals at 60 GHz or other frequencies between about 10 GHz and 400 GHz.

Wireless circuitry in device 1200 may support communications using the IEEE 802.15.4 ultra-wideband protocol. In an IEEE 802.15.4 system, a pair of devices may exchange wireless time stamped messages. Time stamps in the messages may be analyzed to determine the time of flight of the messages and thereby determine the distance (range) between the devices.

Image sensors may include one or more visible digital image sensors (visible-light cameras) and/or one or more infrared digital image sensors (infrared-light cameras). Image sensors may, if desired, be used to measure distances. For example, an infrared time-of-flight image sensor may be used to measure the time that it takes for an infrared light pulse to reflect back from objects in the vicinity of device 1200, which may in turn be used to determine the distance to those objects. Visible imaging systems such as a front and/or rear-facing camera in device 1200 may also be used to determine the position of objects in the environment. For example, control circuitry may use image sensors to perform simultaneous localization and mapping (SLAM). SLAM refers to the process of using images to determine the position of objects in the environment while also constructing a representation of the imaged environment. Visual SLAM techniques include detecting and tracking certain features in images such as edges, textures, room corners, window corners, door corners, faces, sidewalk edges, street edges, building edges, tree trunks, and other prominent features. Control circuitry 1216 may rely entirely upon image sensors to perform simultaneous localization and mapping, or control circuitry 1216 may synthesize image data with range data from one or more distance sensors (e.g., light-based proximity sensors). If desired, control circuitry 1216 may use the display to display a visual representation of the mapped environment.

Input-output devices may include motion sensor circuitry. Motion sensor circuitry may include one or more accelerometers (e.g., accelerometers that measure acceleration along one, two, or three axes), gyroscopes, barometers, magnetic sensors (e.g., compasses), image sensors (e.g., image sensor) and other sensor structures. Sensors may, for example, include one or more microelectromechanical systems (MEMS) sensors (e.g., accelerometers, gyroscopes, microphones, force sensors, pressure sensors, capacitive sensors, or any other suitable type of sensor formed using microelectromechanical systems technology).

Control circuitry 1216 may be used to store and process motion sensor data. If desired, motion sensors, processing circuitry, and storage that form motion sensor circuitry may form part of a system-on-chip integrated circuit (as an example).

Input-output devices may include movement generation circuitry. Movement generation circuitry may receive control signals from control circuitry 1216. Movement generation circuitry may include electromechanical actuator circuitry that, when driven, moves device 1200 in one or more directions. For example, movement generation circuitry may laterally move device 1200 and/or may rotate device 1200 around one or more axes of rotation. Movement generation circuitry may, for example, include one or more actuators formed at one or more locations of device 1200. When driven by a motion control signal, actuators may move (e.g., vibrate, pulse, tilt, push, pull, rotate, etc.) to cause device 1200 to move or rotate in one or more directions. The movement may be slight (e.g., not noticeable or barely noticeable to a user of device 1200), or the movement may be substantial. Actuators may be based on one or more vibrators, motors, solenoids, piezoelectric actuators, speaker coils, or any other desired device capable of mechanically (physically) moving device 1200.

Some or all of movement generation circuitry such as actuators may be used to perform operations that are unrelated to rotation of device 1200. For example, actuators may include vibrators that are actuated to issue a haptic alert or notification to a user of device 1200. Such alerts may include, for example, a received text message alert identifying that device 1200 has received a text message, a received telephone call alert, a received email alert, an alarm notification alert, a calendar notification alert, or any other desired notification. By actuating the actuator, device 1200 may inform the user of any desired device condition.

Motion sensor circuitry may sense motion of device 1200 that is generated by movement generation circuitry. If desired, motion sensor circuitry may provide feedback signals associated with the sensed motion of device 1200 to movement generation circuitry. Movement generation circuitry may use the feedback signals to control actuation of the movement generation circuitry.

Control circuitry 1216 may use motion sensor circuitry and/or movement generation circuitry to determine the angle of arrival of wireless signals received by device 1200 from another electronic device. For example, control circuitry 1216 may use movement generation circuitry to move device 1200 from one position to another. Motion sensor circuitry may be used to track the movement of device 1200 as it is moved between the different positions. At each position, control circuitry 1216 may receive wireless signals from another electronic device. Control circuitry 1216 may process the received wireless signals together with the motion data from motion sensor circuitry to more accurately determine the position of the other electronic device. The use of motion generation circuitry is merely illustrative, however. If desired, motion sensor circuitry may track movement of device 1200 that is not caused by motion generation circuitry. This may include a user's natural, unprompted movement of device 1200 and/or the user's movement of device 1200 after the user is prompted (by display, audio circuitry, a haptic output device in device 1200, or any other suitable output device) to move device 1200 in a particular fashion.

Other sensors that may be included in input-output devices include ambient light sensors for gathering information on ambient light levels, proximity sensor components (e.g., light-based proximity sensors, capacitive proximity sensors, and/or proximity sensors based on other structures), depth sensors (e.g., structured light depth sensors that emit beams of light in a grid, a random dot array, or other pattern, and that have image sensors that generate depth maps based on the resulting spots of light produced on target objects), sensors that gather three-dimensional depth information using a pair of stereoscopic image sensors, LIDAR (light detection and ranging) sensors, radar sensors, and other suitable sensors.

Input-output circuitry may include wireless communications circuitry for communicating wirelessly with external equipment. Wireless communications circuitry may include radio frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Communications module 1210 may include radio-frequency transceiver circuitry for handling various radio-frequency communications bands. For example, communication module 1210 may include transceiver circuitry. Transceiver circuitry may be wireless local area network transceiver circuitry. Transceiver circuitry may handle 2.4 GHz and 5 GHz bands for Wi-Fi® (IEEE 802.11) communications and may handle the 2.4 GHz Bluetooth® communications band.

Circuitry may use cellular telephone transceiver circuitry for handling wireless communications in frequency ranges such as a communications band from 700 to 960 MHz, a band from 1710 to 2170 MHz, a band from 2300 to 2700 MHz, other bands between 700 and 2700 MHz, higher bands such as LTE bands 42 and 43 (3.4-3.6 GHz), or other cellular telephone communications bands. Circuitry may handle voice data and non-voice data.

Millimeter wave transceiver circuitry (sometimes referred to as extremely high frequency transceiver circuitry) may support communications at extremely high frequencies (e.g., millimeter wave frequencies such as extremely high frequencies of 10 GHz to 400 GHz or other millimeter wave frequencies). For example, circuitry may support IEEE 802.11ad communications at 60 GHz. Circuitry may be formed from one or more integrated circuits (e.g., multiple integrated circuits mounted on a common printed circuit in a system-in-package device, one or more integrated circuits mounted on different substrates, etc.).

Ultra-wideband transceiver circuitry may support communications using the IEEE 802.15.4 protocol and/or other wireless communications protocols. Ultra-wideband wireless signals may be characterized by bandwidths greater than 500 MHz or bandwidths exceeding 20% of the center frequency of radiation. The presence of lower frequencies in the baseband may allow ultra-wideband signals to penetrate through objects such as walls. Transceiver circuitry may operate in a 2.4 GHz frequency band, a 6.5 GHz frequency band, an 8 GHz frequency band, and/or at other suitable frequencies.

Wireless communications circuitry may include satellite navigation system circuitry such as Global Positioning System (GPS) receiver circuitry for receiving GPS signals at 1575 MHz or for handling other satellite positioning data (e.g., GLONASS signals at 1609 MHz). Satellite navigation system signals for a receiver are received from a constellation of satellites orbiting the earth.

In satellite navigation system links, cellular telephone links, and other long-range links, wireless signals are typically used to convey data over thousands of feet or miles. In Wi-Fi® and Bluetooth® links at 2.4 and 5 GHz and other short-range wireless links, wireless signals are typically used to convey data over tens or hundreds of feet. Extremely high frequency (EHF) wireless transceiver circuitry may convey signals over these short distances that travel between transmitter and receiver over a line-of-sight path. To enhance signal reception for millimeter wave communications, phased antenna arrays and beam steering techniques may be used (e.g., schemes in which antenna signal phase and/or magnitude for each antenna in an array is adjusted to perform beam steering). Antenna diversity schemes may also be used to ensure that the antennas that have become blocked or that are otherwise degraded due to the operating environment of device 1200 can be switched out of use and higher-performing antennas used in their place.

Wireless communications circuitry can include circuitry for other short-range and long-range wireless links if desired. For example, wireless communications circuitry 36 may include circuitry for receiving television and radio signals, paging system transceivers, near field communications (NFC) circuitry, etc.

The one or more applications on device 1200 can include any applications installed on the device 1200, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or advanced audio codec (AAC) files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations, and the like) on a display surface. In another example, a timer module can be a software timer. The timer module can also be implemented in hardware. The time module can maintain various timers for any number of events.

I/O subsystem 1212 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1212 can include a display and user input devices such as a keyboard, mouse, and/or trackpad. In some embodiments, I/O subsystem 1212 can include a touch-sensitive display. A touch-sensitive display can also accept input from the user based at least in part on haptic and/or tactile contact. In some embodiments, a touch-sensitive display forms a touch-sensitive surface that accepts user input. The touch-sensitive display/surface (along with any associated modules and/or sets of instructions in computer-readable medium) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 1212 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1200 can include a touchpad (not shown) for activating or deactivating particular functions. In some embodiments, the touchpad is a touch-sensitive area of the device 1200 that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

As described above, one aspect of the present technology is the gathering, sharing, and use of data, including an authentication tag and data from which the tag is derived. The present disclosure contemplates that, in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to authenticate another device, and vice versa to control which device ranging operations may be performed. Further, other uses for personal information data that benefit the user are also contemplated by the present disclosure. For instance, health and fitness data may be shared to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sharing content and performing ranging, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, users may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Although the present disclosure has been described with respect to specific embodiments, it will be appreciated that the disclosure is intended to cover all modifications and equivalents within the scope of the following claims.

All patents, patent applications, publications, and descriptions mentioned herein are incorporated by reference in their entirety for all purposes. None is admitted to be prior art.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure. The use of "or" is intended to mean an "inclusive or," and not an "exclusive or," unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

The specific details of particular embodiments may be combined in any suitable manner or varied from those shown and described herein without departing from the spirit and scope of embodiments of the described techniques.

The above description of exemplary embodiments of the described techniques has been presented for the purposes of illustration and description. It is not intended to be exhaustive or to limit the described techniques to the precise form described, and many modifications and variations are possible in light of the teaching above. The embodiments were chosen and described in order to best explain the principles of the described techniques and its practical applications to thereby enable others skilled in the art to best utilize the described techniques in various embodiments and with various modifications as are suited to the particular use contemplated.

All publications, patents, and patent applications cited herein are hereby incorporated by reference in their entirety for all purposes.

What is claimed is:

1. A method performed by a computing device, the method comprising:
   receiving, via a first wireless connection, from an electronic device, a request to securely obtain sender payment information using a secure data exchange module device of the computing device, wherein the computing device and the electronic device utilize a same user account;
   configuring the secure data exchange module device for conducting a secure reception of the sender payment information via a second wireless connection, wherein the secure data exchange module device is configured by:
   loading an applet associated with the secure data exchange module device on the computing device; and
   updating a configuration of the applet with information specific to a service provider configured to process a transaction with the sender payment information;
   transmitting a notification to the electronic device via the first wireless connection, the notification indicating that the secure data exchange module device is ready to collect the sender payment information;
   providing a user interface on the computing device for conducting the secure reception of the sender payment information;
   receiving, via the secure data exchange module device, the sender payment information;
   transmitting, via the first wireless connection, the sender payment information to the electronic device;
   receiving, from the electronic device and via the first wireless connection, confirmation of a successful processing of the sender payment information; and
   providing, via the user interface, an indication of the confirmation of the successful processing of the transaction with the sender payment information by the service provider.

2. The method of claim 1, further comprising receiving a user input authorizing the computing device to conduct the secure reception of the sender payment information.

3. The method of claim 1, wherein the electronic device and the computing device are paired.

4. The method of claim 1, wherein the secure data exchange module device uses near field communication protocol.

5. The method according to claim 1, wherein the electronic device is configured to transmit the sender payment information to the service provider.

6. The method according to claim 1, wherein the electronic device is configured to receive the configuration from the service provider.

7. The method of claim 1, wherein configuring the secure data exchange module device further comprises:
   verifying the applet is loaded;
   verifying the configuration is updated; and
   verifying an attestation of the computing device is conducted.

8. A non-transitory computer-readable medium storing a set of instructions, the set of instructions comprising one or more instructions that, when executed by one or more processors of a computing device, cause the computing device to:
   receive, via a first wireless connection, a request from an electronic device to securely obtain sender payment information using a secure data exchange module device of the computing device, wherein the computing device and the electronic device utilize a same user account;
   configure the secure data exchange module device for conducting a secure reception of the sender payment information via a second wireless connection, wherein the secure data exchange module device is configured by:
   loading an applet associated with the secure data exchange module device on the computing device; and
   updating a configuration of the applet with information specific to a service provider configured to process a transaction with the sender payment information;
   transmit a notification to the electronic device via the first wireless connection, the notification indicating that the secure data exchange module device is ready to collect the sender payment information;
   provide a user interface on the computing device for conducting the secure reception of the sender payment information;
   receive, via the secure data exchange module device, the sender payment information;
   transmit, via the first wireless connection, the sender payment information to the electronic device;
   receive, from the electronic device and via the first wireless connection, confirmation of a successful processing of the sender payment information; and
   provide, via the user interface, an indication of the confirmation of the successful processing of the transaction with the sender payment information by the service provider.

9. The non-transitory computer-readable medium of claim 8, wherein the one or more instructions further cause the computing device to receive a user input authorizing the computing device to conduct the secure reception of the sender payment information.

10. The non-transitory computer-readable medium of claim 8, wherein the electronic device and the computing device are paired.

11. The non-transitory computer-readable medium of claim 8, wherein the secure data exchange module device uses near field communication protocol.

12. The non-transitory computer-readable medium of claim 8, wherein the electronic device is configured to transmit the sender payment information to the service provider.

13. The non-transitory computer-readable medium of claim 8, wherein the electronic device is configured to receive the configuration from the service provider.

14. The non-transitory computer-readable medium of claim 8, wherein the one or more instructions, that cause the computing device to configure the secure data exchange module device, further cause the computing device to:
- verify the applet is loaded;
- verify the configuration is updated; and
- verify an attestation of the computing device is conducted.

15. A computing device, comprising:
- one or more memories; and
- one or more processors, communicatively coupled to the one or more memories, configured to:
  - receive, via a first wireless connection, a request from an electronic device to securely obtain sender payment information using a secure data exchange module device of the computing device, wherein the computing device and the electronic device utilize a same user account;
  - configure the secure data exchange module device for conducting a secure reception of the sender payment information via a second wireless connection, wherein the secure data exchange module device is configured by:
    - loading an applet associated with the secure data exchange module device on the computing device; and
    - updating a configuration of the applet with information specific to a service provider configured to process a transaction with the sender payment information;
  - transmit a notification to the electronic device via the first wireless connection, the notification indicating that the secure data exchange module device is ready to collect the sender payment information;
  - provide a user interface on the computing device for conducting the secure reception of the sender payment information;
  - receive, via the secure data exchange module device, the sender payment information;
  - transmit, via the first wireless connection, the sender payment information to the electronic device;
  - receive, from the electronic device and via the first wireless connection, confirmation of a successful processing of the sender payment information; and
  - provide, via the user interface, an indication of the confirmation of the successful processing of the transaction with the sender payment information by the service provider.

16. The computing device of claim 15, wherein the one or more processors are further configured to receive a user input authorizing the computing device to conduct the secure reception of the sender payment information.

17. The computing device of claim 15, wherein the electronic device and the computing device are paired.

18. The computing device of claim 15, wherein the secure data exchange module device uses near field communication protocol.

* * * * *